(12) United States Patent
Endo

(10) Patent No.: US 12,034,259 B2
(45) Date of Patent: Jul. 9, 2024

(54) CONTACTOR ROTARY CONNECTOR

(71) Applicant: NEC Platforms, Ltd., Kawasaki (JP)

(72) Inventor: Kunihiko Endo, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 325 days.

(21) Appl. No.: 17/609,481

(22) PCT Filed: May 12, 2020

(86) PCT No.: PCT/JP2020/018905
§ 371 (c)(1),
(2) Date: Nov. 8, 2021

(87) PCT Pub. No.: WO2020/230772
PCT Pub. Date: Nov. 19, 2020

(65) Prior Publication Data
US 2022/0224066 A1    Jul. 14, 2022

(30) Foreign Application Priority Data

May 13, 2019 (JP) .................................. 2019-090559

(51) Int. Cl.
*H01R 39/00* (2006.01)
*H01R 12/72* (2011.01)
(Continued)

(52) U.S. Cl.
CPC .......... *H01R 39/00* (2013.01); *H01R 12/721* (2013.01); *H01R 13/2407* (2013.01); *H01R 13/629* (2013.01)

(58) Field of Classification Search
CPC .......................... H01R 12/721; H01R 13/2407; H01R 13/629; H01R 39/00
(Continued)

(56) References Cited

U.S. PATENT DOCUMENTS 2,885,500 A * 5/1959 Wall ..................... H01H 9/0066
200/18
3,636,499 A * 1/1972 Winklebleck .......... H01R 12/88
200/8 R
(Continued)

FOREIGN PATENT DOCUMENTS

| JP | S11-000702 Y1 | 1/1936 |
| JP | H08-306444 A | 11/1996 |
| JP | 2016-045907 A | 4/2016 |

OTHER PUBLICATIONS

International Search Report for PCT Application No. PCT/JP2020/018905, mailed on Jul. 28, 2020.

*Primary Examiner* — Marcus E Harcum

(57) ABSTRACT

The contactor rotary connector is provided with a first connector having a first terminal supported by a first mold; and a second connector having a second terminal supported by a second mold. The first connector is provided with a first space block. The second connector is provided with a second space block; a fixed component capable of holding the first mold and the second mold in a coupled state by being rotatably housed in the first space block and the second space block; a contactor capable of contacting the first terminal and the second terminal; and a rotating shaft that integrally couples the contactor and the fixed component, is rotatably supported by one of the first mold and the second mold, and is capable of connecting the first terminal and the second terminal by rotating the contactor.

8 Claims, 21 Drawing Sheets

(51) Int. Cl.
*H01R 13/24* (2006.01)
*H01R 13/629* (2006.01)

(58) Field of Classification Search
USPC ............ 439/259, 13, 677, 17, 372, 680, 681
See application file for complete search history.

(56) References Cited

U.S. PATENT DOCUMENTS

| | | | | |
|---|---|---|---|---|
| 3,950,059 A * | 4/1976 | Anhalt | ................ | H01R 13/193 |
| | | | | 439/261 |
| 4,109,987 A * | 8/1978 | Bourdon | ................ | F16B 5/10 |
| | | | | 439/372 |
| 4,392,705 A * | 7/1983 | Andrews, Jr. | .......... | H01R 12/89 |
| | | | | 439/259 |
| 4,469,389 A * | 9/1984 | Grabbe | ................ | H01R 12/88 |
| | | | | 439/373 |
| 4,488,766 A * | 12/1984 | Cosmo | ................ | H01R 12/88 |
| | | | | 439/325 |
| 4,534,606 A * | 8/1985 | Olsson | ................ | H01R 12/88 |
| | | | | 439/492 |
| 4,744,768 A * | 5/1988 | Rios | ................ | H01R 13/193 |
| | | | | 439/264 |
| 4,969,831 A * | 11/1990 | Kuzuno | ............... | H01R 13/193 |
| | | | | 439/732 |
| 5,415,559 A * | 5/1995 | Ichimura | ............... | H01R 12/714 |
| | | | | 439/259 |
| 5,697,800 A | 12/1997 | Aramizu | | |
| 5,833,483 A * | 11/1998 | Lai | ................ | H05K 7/1007 |
| | | | | 439/259 |
| 6,030,233 A * | 2/2000 | Kamiyamane | ........ | H01R 13/71 |
| | | | | 200/51.09 |
| 6,435,892 B1 * | 8/2002 | Billman | ............... | H01R 12/721 |
| | | | | 439/260 |
| 6,679,714 B2 * | 1/2004 | Kimura | ................ | H01R 12/88 |
| | | | | 439/372 |
| 6,767,231 B1 * | 7/2004 | Martin | ............ | H01R 13/62944 |
| | | | | 439/372 |
| 7,429,197 B2 * | 9/2008 | Weis | ................ | H01R 13/46 |
| | | | | 439/680 |
| 7,527,513 B1 * | 5/2009 | Okuyama | ............. | H01R 13/89 |
| | | | | 439/267 |
| 7,633,759 B2 * | 12/2009 | Tracy | ................ | H01R 13/193 |
| | | | | 439/259 |
| 9,548,560 B2 * | 1/2017 | Ikenaka | ............... | H01R 13/629 |
| 11,112,448 B2 * | 9/2021 | Park | ................ | H01R 12/82 |
| 2004/0229491 A1 * | 11/2004 | Maeda | ................ | H01R 12/88 |
| | | | | 439/260 |
| 2008/0305659 A1 * | 12/2008 | Hemmi | ............... | H01R 12/88 |
| | | | | 439/77 |
| 2009/0047825 A1 * | 2/2009 | Wu | ................ | H01R 13/504 |
| | | | | 439/680 |
| 2012/0021614 A1 * | 1/2012 | Chen | ................ | H01R 12/716 |
| | | | | 439/13 |
| 2012/0045945 A1 * | 2/2012 | Tai | ................ | H01R 13/6456 |
| | | | | 439/680 |
| 2014/0017957 A1 * | 1/2014 | Horchler | ............ | H01R 13/631 |
| | | | | 439/680 |

\* cited by examiner

CONTACTOR ROTARY CONNECTOR

This application is a National Stage Entry of PCT/JP2020/018905 filed on May 12, 2020, which claims priority from Japanese Patent Application 2019-090559 filed on May 13, 2019, the contents of all of which are incorporated herein by reference, in their entirety.

TECHNICAL FIELD

The present invention relates to a contactor rotary connector.

BACKGROUND ART

Patent Document 1 discloses, as a contactor rotary connector, a configuration in which a relay terminal is provided on the upper surface of a first wing portion of a rotating body, and a relay terminal is provided on the lower surface of a second wing portion of the rotating body.

According to this contactor rotary connector, by rotating the rotating body in the clockwise direction, the relay terminal of the first wing portion connects to a contact of a first connector, and the relay terminal of the second wing portion connects to a contact of a second connector. Thereby, the first connector and the second connector become electrically connected.

CITATION LIST

Patent Literature

[Patent Document 1] Japanese Unexamined Patent Application, First Publication No. 2016-45907

SUMMARY OF THE INVENTION

Problems to be Solved by the Invention

However, in the contactor rotary connector of Patent Document 1, it is difficult to accurately position the relay terminal of the first wing portion with the contact of the first connector, and to accurately position the relay terminal of the second wing portion with the contact of the second connector. For that reason, the connection of the first and second connectors with the contacts (that is, terminals) by the relay terminals (that is, contactors) of the first and second wing portions may become unstable.

An example of an object of the present invention is to provide a contactor rotary connector that solves all of the above-mentioned problems.

Means for Solving the Problems

The contactor rotary connector of the first aspect is provided with a first connector having a first terminal supported by a first mold; and a second connector having a second terminal supported by a second mold. The first connector is provided with a first space block provided in the first mold. The second connector is provided with a second space block provided in the second mold; a fixed component capable of holding the first mold and the second mold in a coupled state by being rotatably housed in the first space block and the second space block in a state in which the second mold is coupled to the first mold; a contactor capable of contacting the first terminal and the second terminal; and a rotating shaft that integrally couples the contactor and the fixed component, is rotatably supported by one of the first mold and the second mold, and is capable of connecting the first terminal and the second terminal by rotating the contactor.

Advantageous Effects of Invention

According to the present invention, a contactor can be stably connected to a terminal.

EXAMPLE EMBODIMENT

Figure 1:
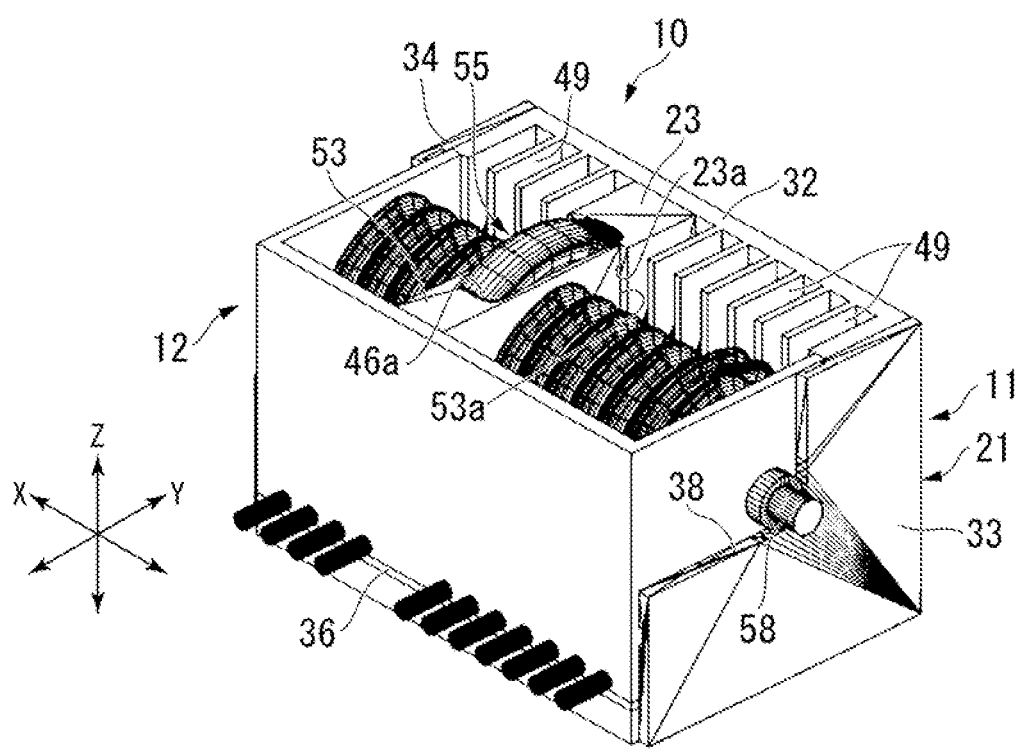
FIG. 1 is a perspective diagram showing a contactor rotary connector according to the first embodiment.

Hereinbelow, each embodiment will be described with reference to the drawings. The same or corresponding configurations are designated by the same reference numerals in all drawings, and common descriptions will be omitted.

First Embodiment

The first embodiment of a contactor rotary connector 10 will be described with reference to FIGS. 1 to 16. The contactor rotary connector 10 can be applied to all connectors mounted on a circuit board, for example. The contactor rotary connector 10 can also be applied to a device that requires tamper resistance, such as preventing removal of a circuit board and disconnection of a signal connection. Further, the contactor rotary connector 10 can be applied to, for example, a device that requires addition or removal of an optional circuit board to a device in operation. In addition, the contactor rotary connector 10 can be applied to a device that needs to maintain an operating state of the device, such as during maintenance and replacement of a circuit board constituting the device.

Figure 2:
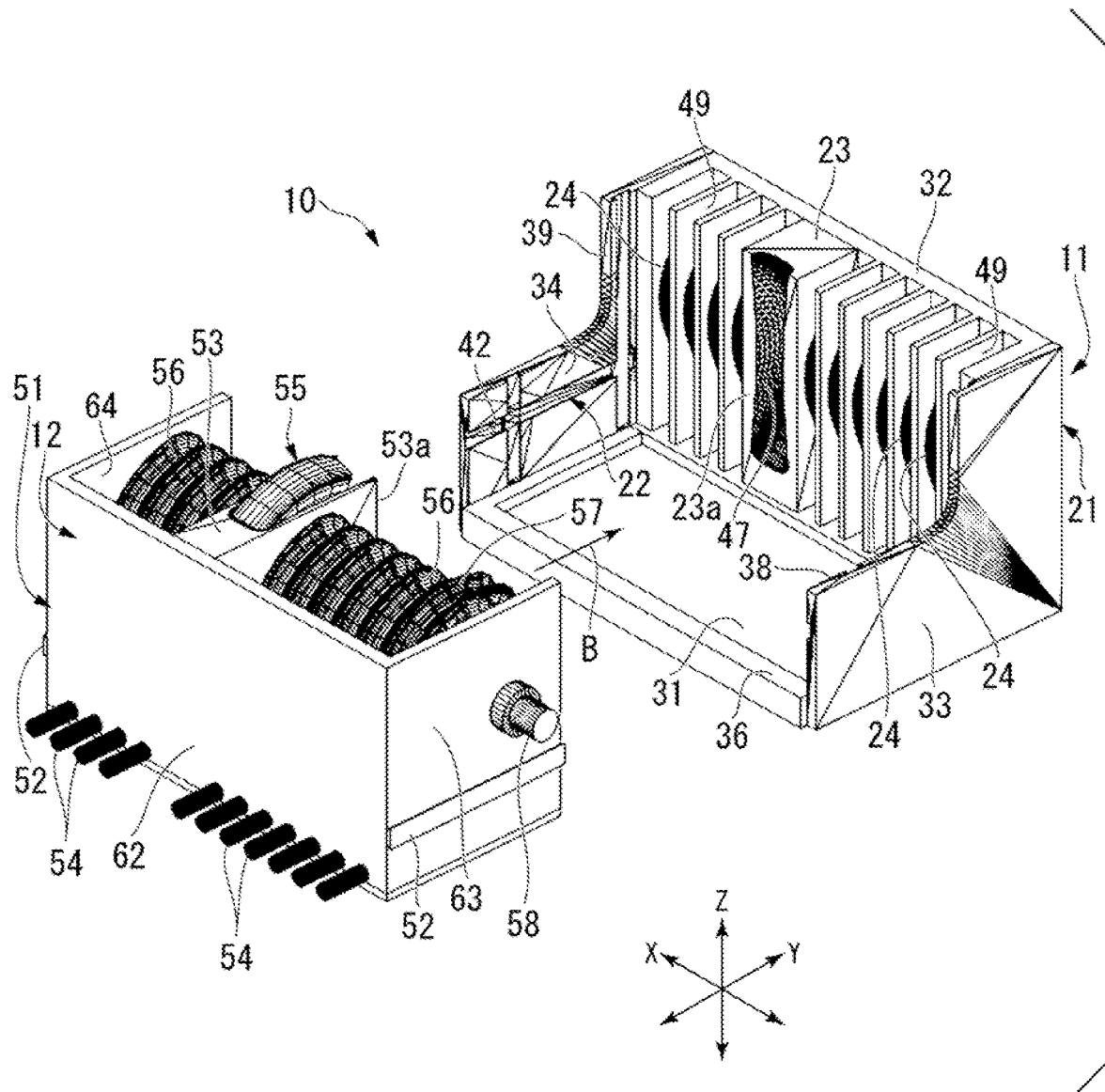
FIG. 2 is an exploded perspective view showing a contactor rotary connector according to the first embodiment.

As shown in FIGS. 1 and 2, the contactor rotary connector 10 is provided with a first connector 11 and a second connector 12.

The first connector 11 is provided with a first mold 21, a first guide 22, a first space block 23, and a first contact pin (first terminal) 24.

Figure 3:
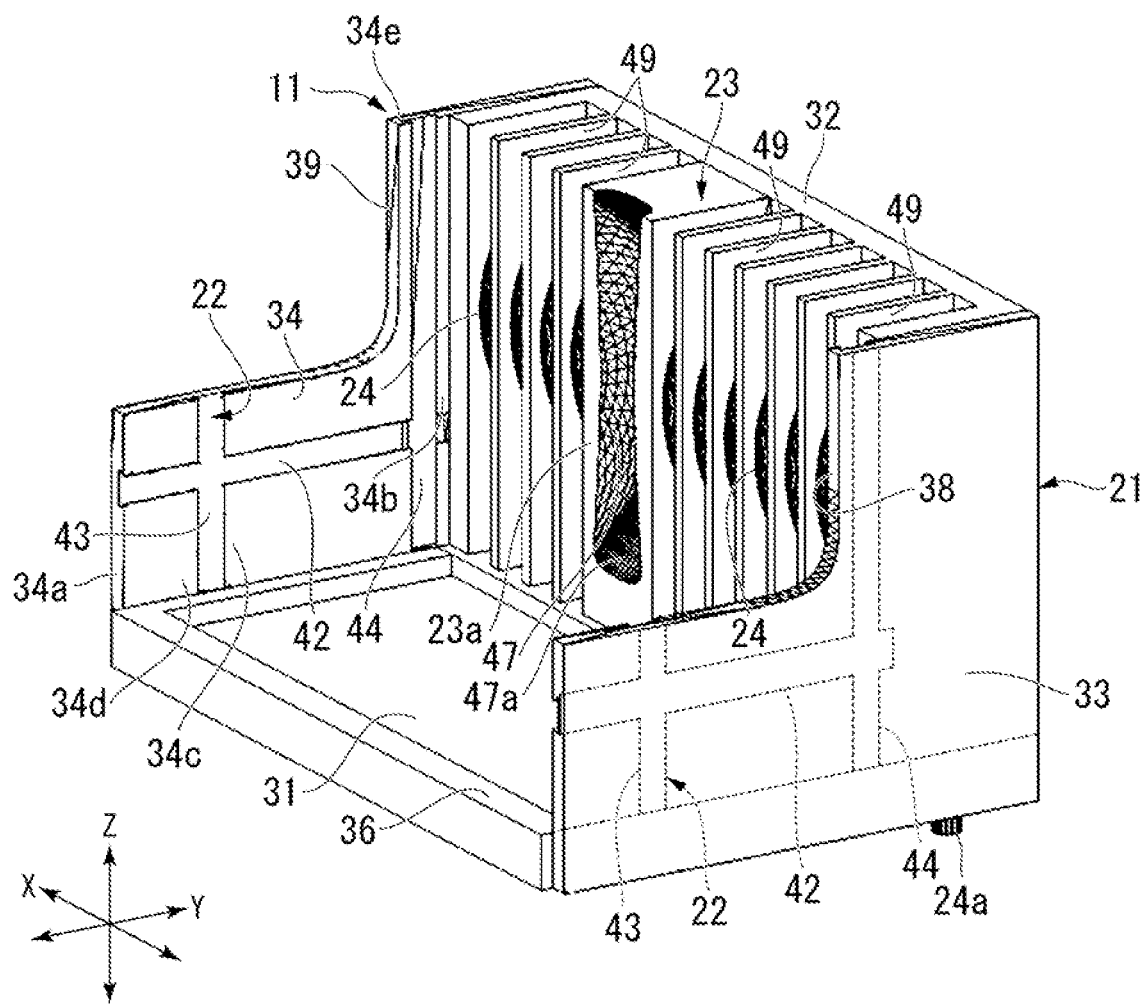
FIG. 3 is a perspective view showing the first connector of the contactor rotary connector in the first embodiment.
Figure 4:
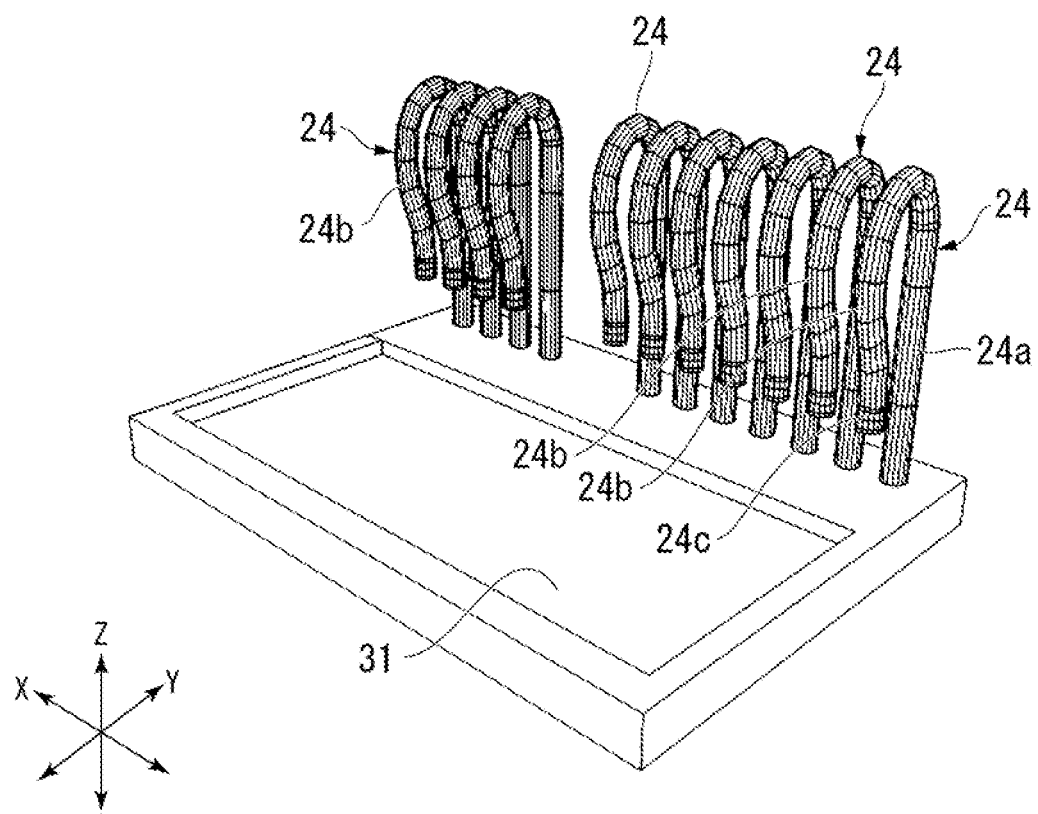
FIG. 4 is a perspective view showing a first contact pin of the first connector in the first embodiment.

As shown in FIGS. 2 to 4, the first mold 21 has a first base (base) 31, a first front wall 32, a first left side wall 33, and a first right side wall 34. The first mold 21 is formed by the first base 31, the first front wall 32, the first left side wall 33, and the first right side wall 34 in a box shape having a first opening 36 that opens to the rear and the upper part.

Hereinbelow, a first direction along the axis of a rotating shaft 58 provided in the second connector 12 is shown as the X direction. A second direction orthogonal to the X direction and extending along the first base 31 is shown as the Y direction. Further, a third direction orthogonal to the X direction and orthogonal to the Y direction is indicated by the Z direction.

The X direction may be described as the left-right direction, the Y direction as the front-back direction, and the Z direction as the up-down direction. Further, in the Y direction, the first connector 11 side may be described as the front side, and the second connector 12 side may be described as the rear side. In addition, in the X direction, the left side of the first space block 23 as viewed from the front of the first connector 11 may be described as the left direction, and the right side of the first space block 23 may be described as the right direction.

The first base 31 is formed in a flat rectangular shape. The first front wall 32 is raised upward from the front side of the first base 31 so as to be orthogonal to the first base 31. The first left side wall 33 is provided on the left side of the first base 31 and the left side of the first front wall 32, and a left recess 38 is formed on the side of the first opening 36. The first right side wall 34 is provided on the right side of the first base 31 and the right side of the first front wall 32, and a right recess 39 is formed on the side of the first opening 36.

The first guide 22 is provided on the inner surface of the first right side wall 34. The first left side wall 33 is provided with the first guide 22 on the inner surface like the first right side wall 34. The first guide 22 of the first right side wall 34 and the first guide 22 of the first left side wall 33 are symmetrical portions. For this reason, each part of the first guide 22 of the first left side wall 33 is designated by the same reference numerals as the first guide 22 of the first right side wall 34, and so a detailed description of the first guide 22 of the first left side wall 33 will be omitted.

The first guide 22 is provided with a first guide groove 42, a second guide groove 43, and a third guide groove 44. The first guide groove 42 is formed in a concave groove that opens on the inner surface of the first right side wall 34. The first guide groove 42 extends in the Y direction from the rear side 34a of the first right side wall 34 to the portion 34b near the front side.

The second guide groove 43 is formed in a concave groove that opens on the inner surface of the first right side wall 34. The second guide groove 43 extends in the Z direction from the right recess 39 to the bottom side 34d of the first right side wall 34 at the portion 34c near the rear side of the first right side wall 34.

The third guide groove 44 is formed in a concave groove that opens on the inner surface of the first right side wall 34. The third guide groove 44 extends in the Z direction from the upper side 34e of the first right side wall 34 to the bottom side 34d of the first right side wall 34 at the portion 34b near the front side of the first right side wall 34.

The first space block 23 is provided on the inner surface of the first front wall 32. The first space block 23 projects from the center in the X direction toward the rear in the Y direction at the inner surface of the first front wall 32. The first space block 23 is formed with a first space 47 that opens to the rear surface 23a. An outer circumference 47a of the first space 47 is formed in an arc shape.

A plurality of spacers 49 are formed between the first space block 23 and the first left side wall 33 at intervals in the X direction. Further, a plurality of the spacers 49 are formed between the first space block 23 and the first right side wall 34 at intervals in the X direction.

A first contact pin 24 is supported between the spacer 49 and the spacer 49 that are adjacent. As shown in FIG. 4, the first contact pin 24 is formed of, for example, an electrically conductive elastic member and has a columnar cross section, and has a first base portion 24a and a first contact portion 24b. The first base portion 24a is raised from the first base 31 along the first front wall 32 in a state of being fixed to the first base 31. In this state, as shown in FIG. 3, a part of the first base portion 24a protrudes outward from the first base 31.

The first contact portion 24b is bent in a curved shape downward from the vicinity of the tip portion of the first base portion 24a. A tip portion 24c of the first contact portion 24b is arranged along the first base portion 24a at intervals in the Y direction with respect to the first base portion 24a.

In this state, when a pressing force (pressing) is applied frontward to the first contact portion 24b, the first contact portion 24b is elastically deformed toward the first base portion 24a.

Figure 5:
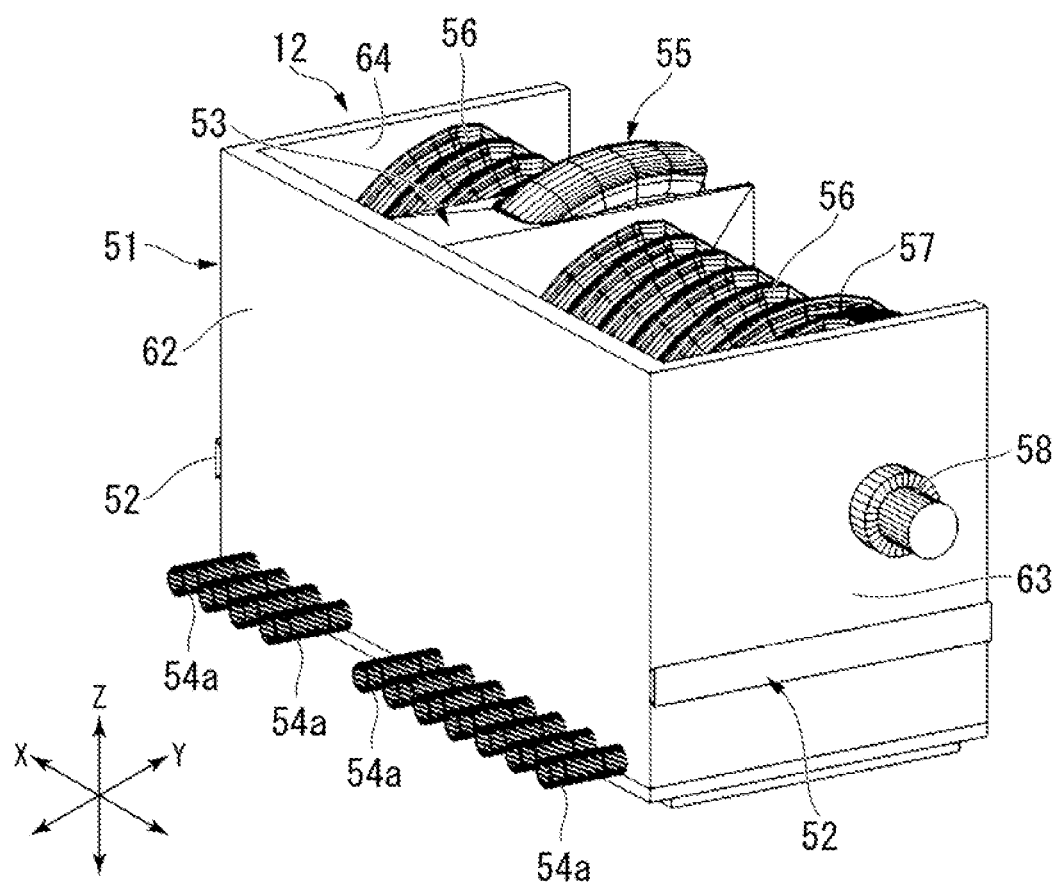
FIG. 5 is a perspective view of the second connector of the contactor rotary connector in the first embodiment as viewed from the rear.
Figure 6:
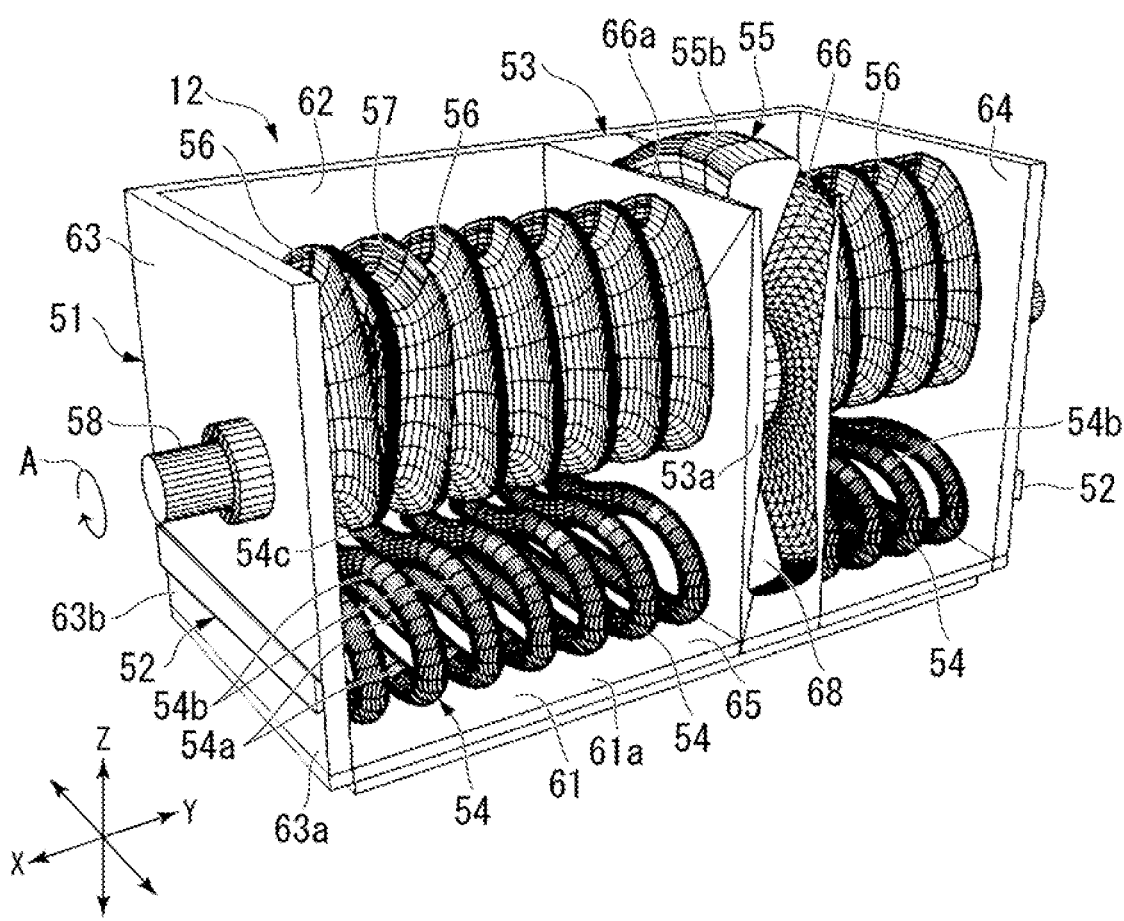
FIG. 6 is a perspective view of the second connector of the contactor rotary connector in the first embodiment as viewed from the front.

As shown in FIGS. 5 and 6, the second connector 12 is configured to be couplable (insertable) to the first connector 11 (see also FIG. 2).

The second connector 12 is provided with a second mold 51, a second guide 52, a second space block 53, a second contact pin (second terminal) 54, a fixed component 55, a standard contact (contactor) 56, a precharge contactor (contactor) 57 and the rotating shaft 58.

The second mold 51 has a second base 61, a second rear wall 62, a second left side wall 63, and a second right side wall 64. The second mold 51 is formed by a second base 61, a second rear wall 62, a second left side wall 63, and a second right side wall 64 in a box shape having a second opening 65 that opens to the front and the upper part.

The second base 61 is formed in a flat rectangular shape. The second rear wall 62 rises upward from the rear side of the second base 61 so as to be orthogonal to the second base 61. The second left side wall 63 is provided on the left side of the second base 61 and the left side of the second rear wall 62. The second right side wall 64 is provided on the right side of the second base 61 and the right side of the second rear wall 62.

The second left side wall 63 is provided with the second guide 52 on the outer surface. The second right side wall 64 is provided with the second guide 52 on the outer surface, similarly to the second left side wall 63. The second guide 52 of the second left side wall 63 and the second guide 52 of the second right side wall 64 are left-right symmetrical portions. Therefore, the second guide 52 of the second right side wall 64 and the second guide 52 of the second left side wall 63 are designated by the same reference numerals, and so a detailed description of the second guide 52 of the second right side wall 64 will be omitted.

The second guide 52 is a convex guide that protrudes outward from the second left side wall 63 and extends in the Y direction from the front side 63a to the rear side 63b of the second left side wall 63. The second guide 52 of the second left side wall 63 is formed so as to be movable in the Y direction along the first guide groove 42 of the first left side wall 33 in a state of being housed (locked) in the first guide groove 42 (see FIG. 2) of the first left side wall 33 of the first mold 21.

The second guide 52 of the second right side wall 64 is movably locked in the Y direction along the first guide groove 42 of the first right side wall 34 in a state of being housed in the first guide groove 42 (see FIG. 2) of the first right side wall 34 of the first mold 21.

As shown in FIG. 2, the second mold 51 is coupled to the first mold 21. The second mold 51 is formed to be insertable from the first opening 36 of the first mold 21 into the interior of the first mold 21 in the Y direction (that is, in the front direction).

The first guide 22 and the second guide 52 are not limited to the shape of the embodiment, and can be made to have other shapes.

Figure 7:
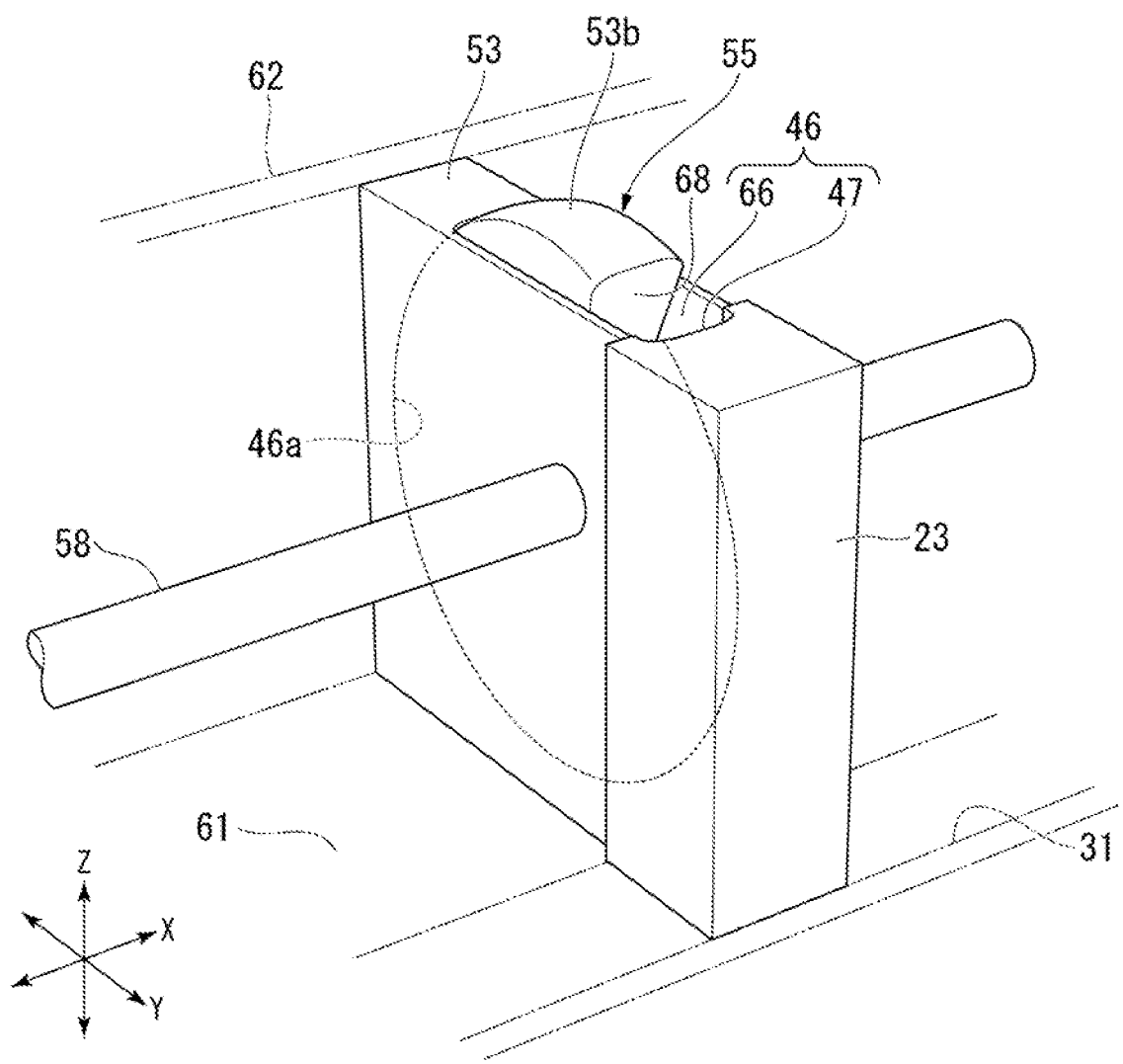
FIG. 7 is a perspective view showing a fixed component, a first space block, and a second space block in the first embodiment.
Figure 8:
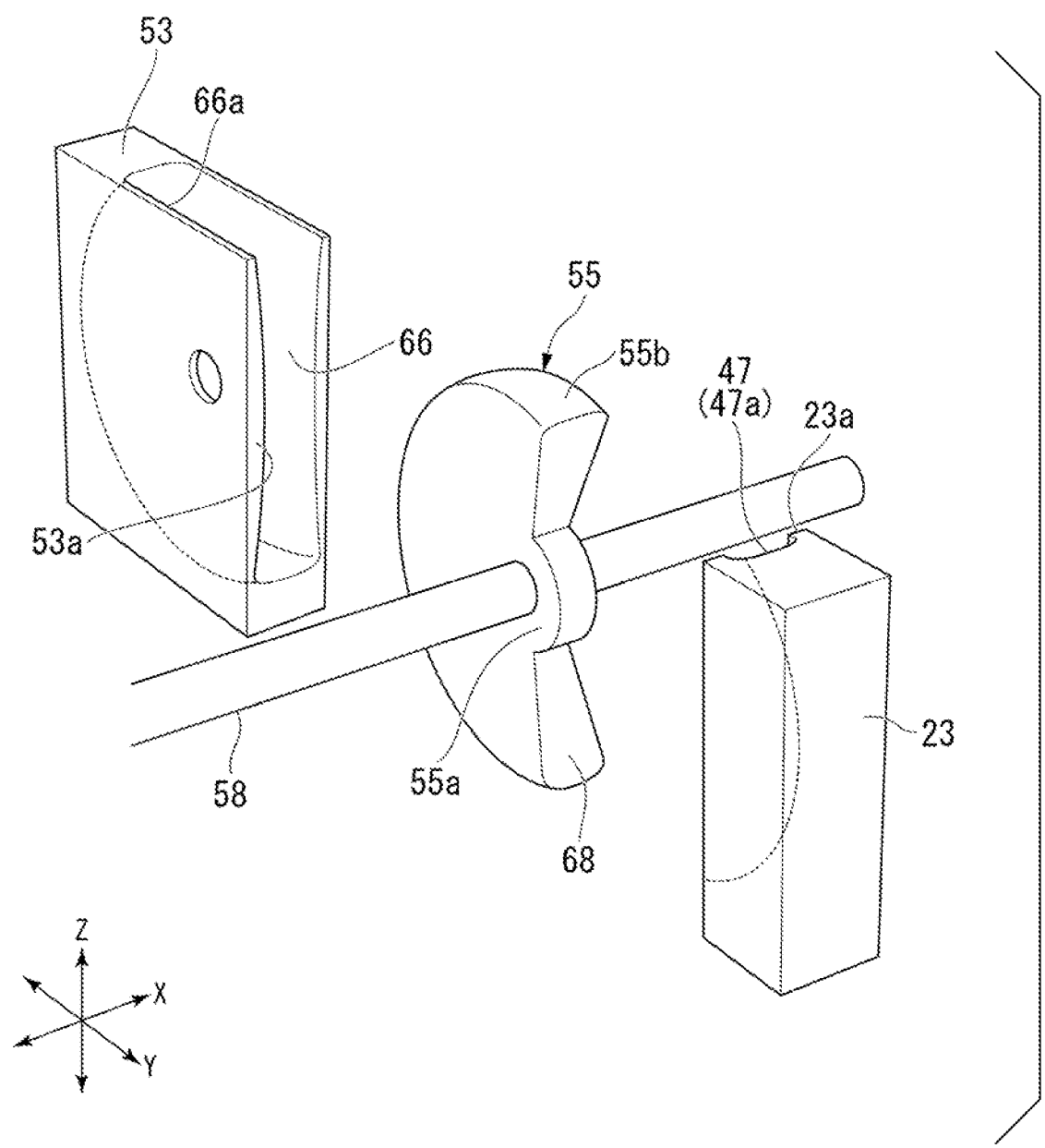
FIG. 8 is an exploded perspective view showing a fixed component, a first space block, and a second space block in the first embodiment.

As shown in FIGS. 2, 7, and 8, the second space block 53 is provided on the inner surface of the second rear wall 62. The second space block 53 projects from the center in the X direction forward in the Y direction until a front end 61a of the second base 61 at the inner surface of the second rear wall 62. A second space 66 that opens to a front surface 53a is formed in the second space block 53. An outer circumference 66a of the second space 66 is formed in an arc shape.

The second space block 53 is arranged at a position where the front surface 53a thereof makes contact with the rear surface 23a of the first space block 23 (see also FIG. 3) in a state of the second mold 51 being inserted into the first mold 21. In this state, a fixed space 46 is formed by the second space 66 and the first space 47. An outer circumference 46a of the fixed space 46 is formed in an arc shape by the outer circumference 47a of the first space 47 and the outer circumference 66a of the second space 66.

Returning to FIGS. 5 and 6, a plurality of second contact pins 54 are supported between the second space block 53 and the second left wall 63 at intervals in the X direction. A plurality of the second contact pins 54 are supported between the second space block 53 and the second right side wall 64 at intervals in the X direction.

As shown in FIG. 6, the second contact pin 54 is formed of, for example, an electrically conductive elastic member and has a columnar cross section, and has a second base portion 54a and a second contact portion 54b. The second base portion 54a extends in the Y direction from the second rear wall 62 along the second base 61 in a state of being fixed to the second rear wall 62. In this state, as shown in FIG. 5, a part of the second base portion 54a protrudes outward from the second rear wall 62.

The second contact portion 54b is bent in a curved shape rearward from around the tip portion of the second base portion 54a. A tip portion 54c of the second contact portion 54b is arranged along the second base portion 54a at an interval in the Z direction (upward) with respect to the second base portion 54a.

In this state, when a pressing force (pressing) acts downward on the second contact portion 54b, the second contact portion 54b elastically deforms toward the second base portion 54a.

As shown in FIGS. 6 to 8, the fixed component 55 is housed in the fixed space 46 of the first space block 23 and the second space block 53. The rotating shaft 58 penetrates a center 55a of the fixed component 55, which is fixed in a state of being orthogonal to the rotating shaft 58. An outer circumference 55b of the fixed component 55 is formed in a circular shape when viewed from the axial direction (that is, the X direction) of the rotating shaft 58, and a fixed recess (recess) 68 is formed in a portion of the outer circumference 55b. The fixed recess 68 is formed in a concave shape from the outer circumference 55b toward the center 55a.

Therefore, the entire fixed component 55 is housed in the second space 66 of the second space block 53 in a state where the fixed recess 68 of the fixed component 55 faces the front surface 53a of the second space block 53. Hereinbelow, this state may be described as a storage position.

For example, the fixed component 55 may have the fixed recess 68 so as to maintain non-contact with the first space block 23 and the first contact pin 24 when coupling the first connector 11 and the second connector 12.

That is, by having the fixed recess 68, the fixed component 55 is kept so as to not be in contact with the first space block 23 and the first contact pin 24 in the state of being arranged in the storage position. Thereby, when the second connector 12 is coupled (connected) to the first connector 11, the fixed component 55 can be kept so as not to be in contact with the first space block 23 and the first contact pin 24.

The fixed component 55 is stored in the first space block 23 and the second space block 53 so as to be rotatable in a state where the second mold 51 is coupled to the first mold 21. Specifically, the fixed component 55 is arranged in a rotatable state in the fixed space 46 formed by the first space 47 of the first space block 23 and the second space 66 of the second space block 53.

The fixed component 55 and the fixed space 46 are formed in a shape that does not cause misalignment or slip off between the first space block 23 and the second space block 53 in a state where the fixed component 55 rotates in the fixed space 46. In other words, the first mold 21 and the second mold 51 can be held in an accurate coupled state in the state of preventing the occurrence of misalignment or slip off between the first mold 21 and the second mold 51 by rotating the fixed component 55 in the fixed space 46.

In the embodiment, a shape in which the fixed component 55 is made to protrude from the first space block 23 and the second space block 53 will be described as an example. However, it is also possible to have a shape in which the fixed component 55 is not made to protrude from the first space block 23 and the second space block 53.

In the embodiment, an example in which the second connector 12 is provided with one fixed component 55 will be described, but the number of fixed components 55 is not limited to one. As another example, for example, it is possible to include two or more fixed components 55. By increasing the number of fixed components 55 to two or more, it is possible to more satisfactorily prevent the occurrence of misalignment or slip off between the first mold 21 and the second mold 51.

Figure 9:
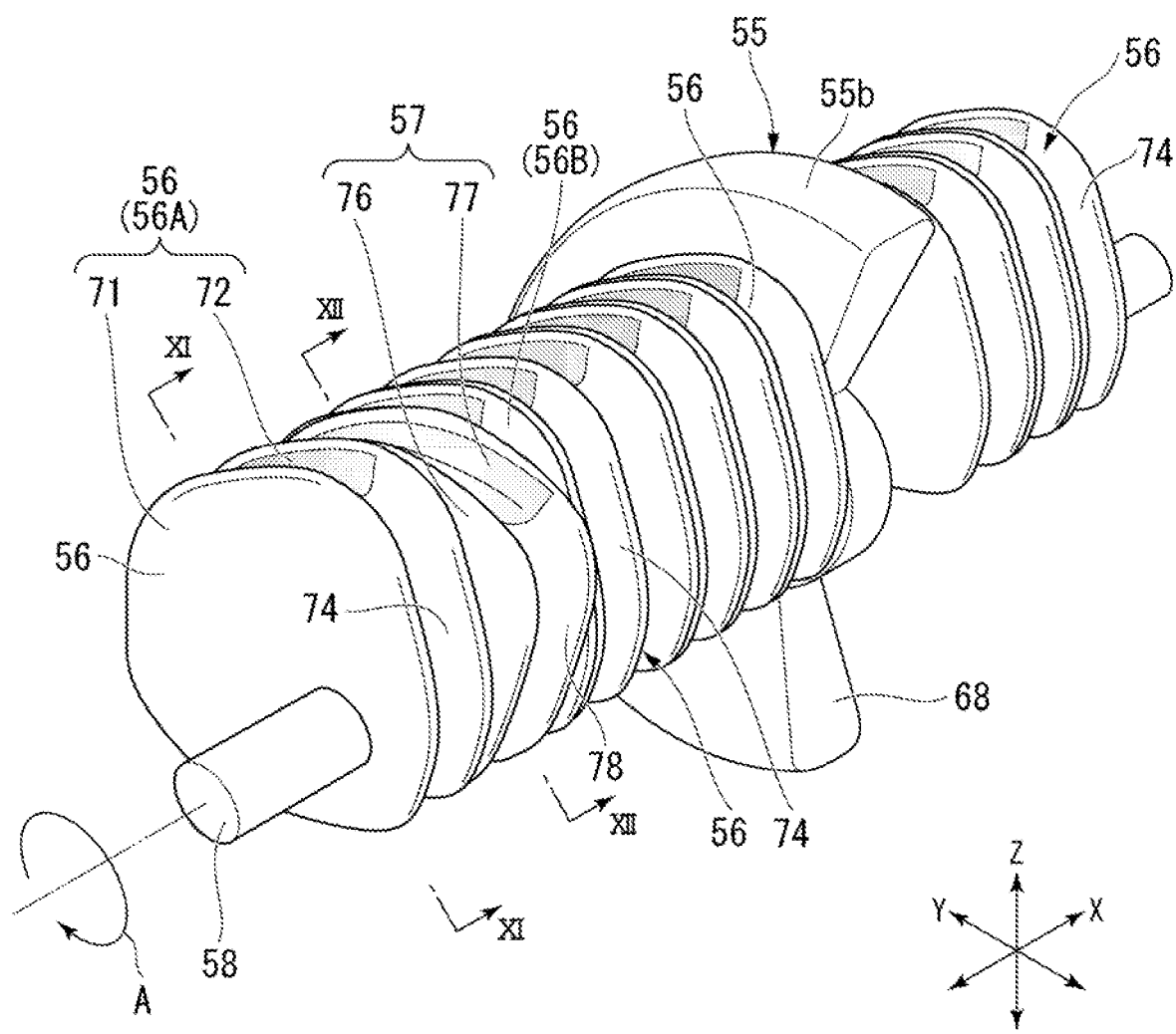
FIG. 9 is a perspective view showing a fixed component and a contactor in the first embodiment.
Figure 10:
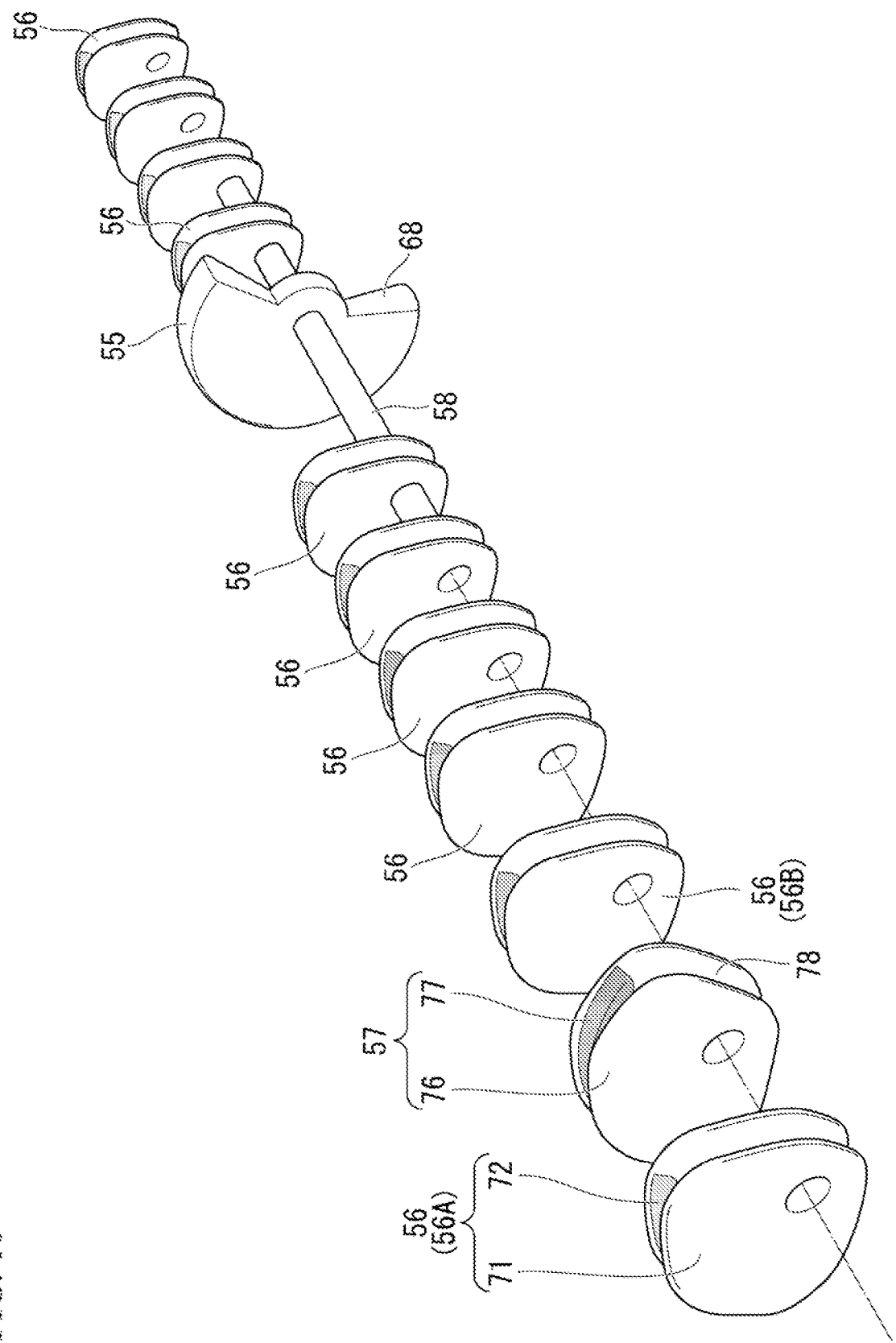
FIG. 10 is an exploded perspective view showing a fixed component and a contactor in the first embodiment.
Figure 11:
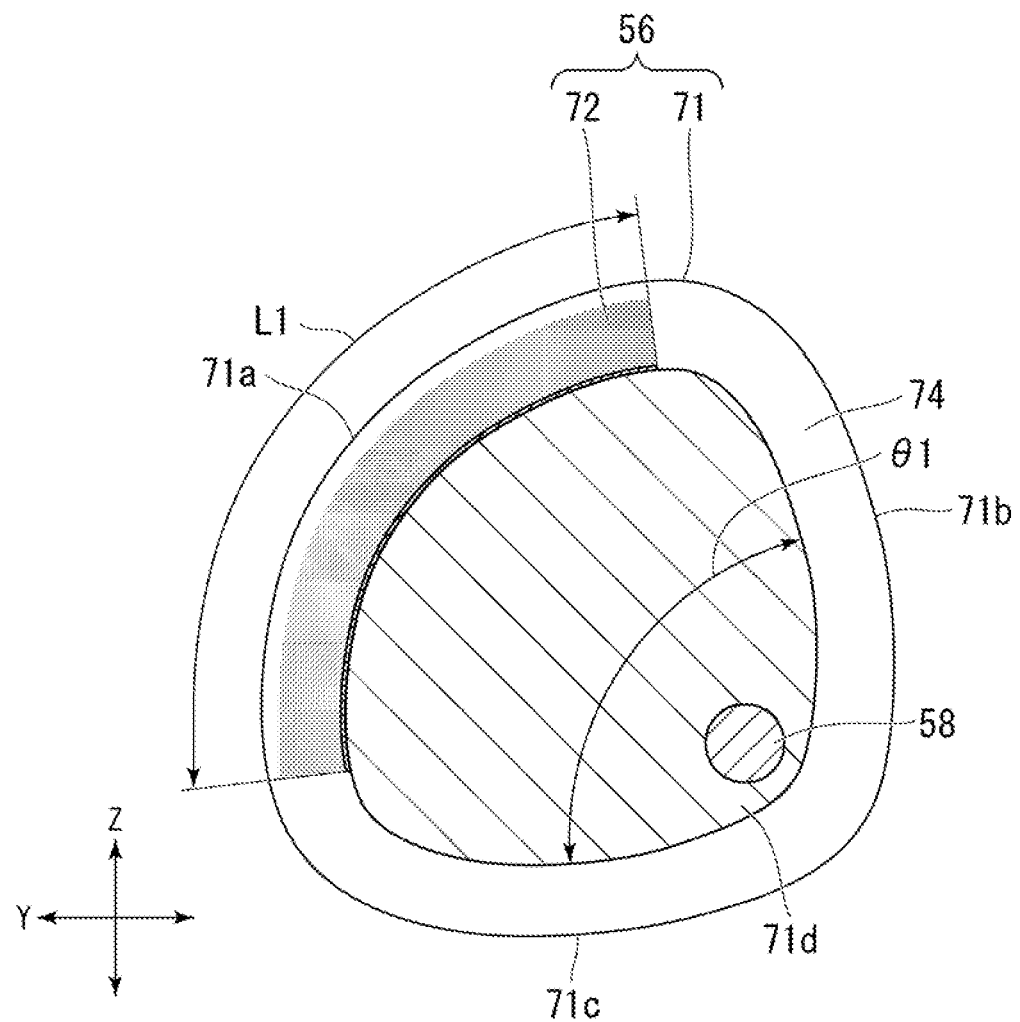
FIG. 11 is a cross-sectional view taken along the line XI-XI of FIG. 9.

As shown in FIGS. 9 to 11, the rotating shaft 58 is provided with a standard contactor 56 and the precharge contactor 57. The standard contactor 56 is provided with a standard base (base) 71 and a standard conductor (conductor) 72.

The standard base 71 is formed of, for example, an insulator having a substantially triangular shape (fan shape) formed by a first curved side 71a, a second curved side 71b, and a third curved side 71c. The first curved side 71a is formed, for example, in a curved shape protruding outward, with the length of the arc being set to a dimension L1. The second curved side 71b and the third curved side 71c are arranged, for example, at an angle θ1 from each other, and are formed in a curved shape protruding outward.

The standard base 71 has a standard groove portion (groove portion) 74 formed over the entire outer circumference. The standard groove portion 74 is formed so as to be able to fit the first contact portion 24b (see FIG. 4) of the first contact pin and the second contact portion 54b (see FIG. 6) of the second contact pin 54.

Further, according to FIG. 11, the standard base 71 is fixed in a state orthogonal to the rotating shaft 58 by the rotating shaft 58 penetrating through a portion 71d of the standard base 71 in the vicinity where the second curved side 71b and the third curved side 71c intersect.

Here, in a state where the fixed component 55 is arranged at the storage position, the second curved side 71b is arranged at a position facing the first contact portion 24b, and the third curved side 71c is arranged at a position facing the second contact portion 54b. In this state, the second curved side 71b is kept in non-contact with the first contact portion 24b, and the third curved side 71c is kept in non-contact with the second contact portion 54b.

Thereby, when the second connector 12 is coupled (connected) to the first connector 11, the standard base 71 (that is, the standard contactor 56) can be kept in a state of non-contact with respect to the first contact portion 24b and the second contact portion 54b.

The standard conductor 72 is provided on the first curved side 71a of the standard base 71. The standard conductor 72 is formed in a groove shape along the standard groove portion 74 of the first curved side 71a. Therefore, by being fitted to the first contact portion 24b (see FIG. 4) and the second contact portion 54b (see FIG. 6), the standard conductor 72 can be brought into stable contact therewith. By being brought into simultaneous contact with the first contact portion 24b and the second contact portion 54b, the standard conductor 72 becomes electrically conductive with the first contact pin 24 and the second contact pin 54.

Here, as described above, the rotating shaft 58 is fixed to the portion 71d of the standard base 71 in the vicinity where the second curved side 71b and the third curved side 71c intersect. Therefore, the rotating shaft 58 is provided at a position offset in the direction away from the standard conductor 72. As a result, the standard contactor 56 rotates together with the rotating shaft 58, whereby the standard conductor 72 can be brought into contact with the first contact portion 24b and the second contact portion 54b.

By forming the standard base 71 with an insulator, the standard conductor 72 can be brought into contact with the first contact portion 24b and the second contact portion 54b with high accuracy. Thereby, the timing accuracy of conduction can be improved.

As shown in FIG. 10, among the plurality of standard contactors 56, the precharge contactor 57 is provided on the inner side in the left-right direction of the outermost standard contactor 56 in the left direction. Further, the standard contactor 56 is provided on the inner side of the precharge contactor 57 in the left-right direction. That is, the precharge contactor 57 is arranged between the outermost standard contactor 56 in the left direction and another standard contactor 56.

Figure 12:
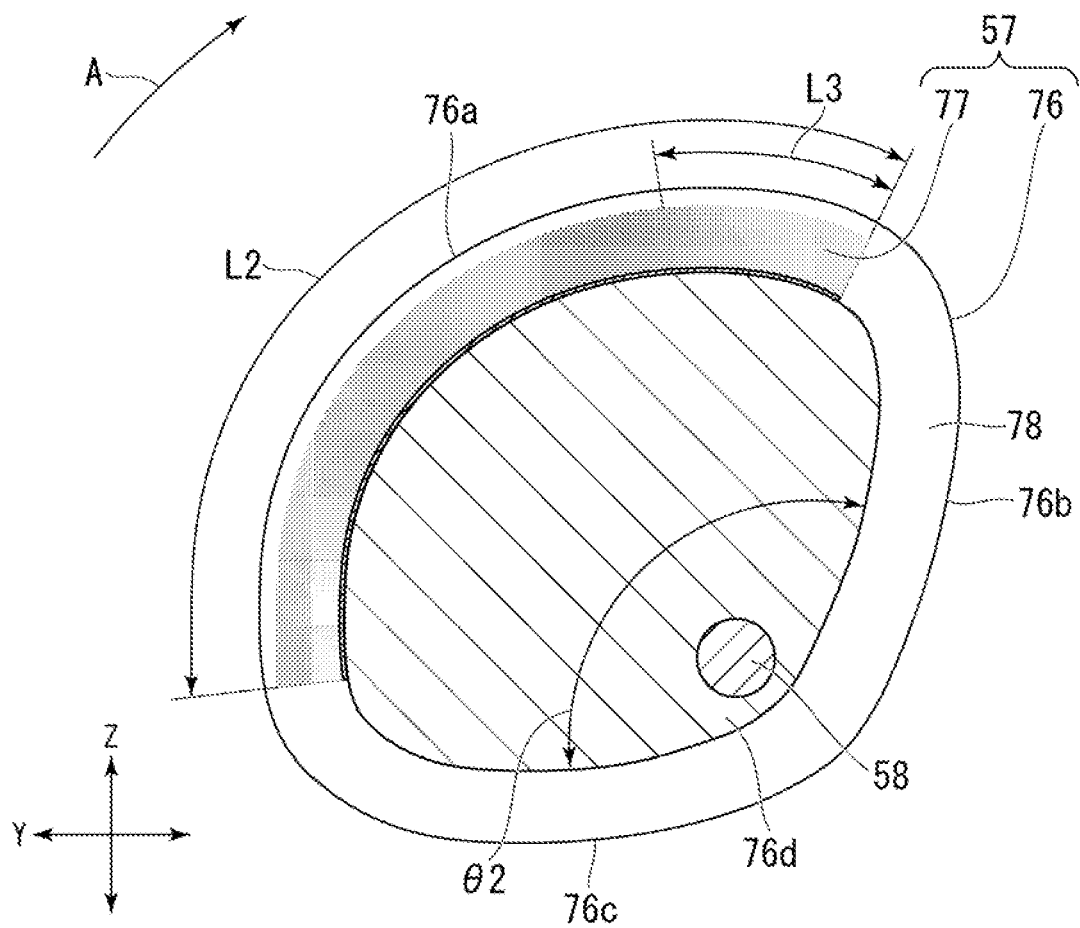
FIG. 12 is a cross-sectional view taken along the line XII-XII of FIG. 9.

As shown in FIGS. 9, 10 and 12, the precharge contactor 57 is provided with a precharge base (base) 76 and a precharge conductor (conductor) 77. The precharge base 76 is for example formed of an insulator having a substantially triangular shape (fan shape) formed by a first precharge curved side 76a, a second precharge curved side 76b, and a third precharge curved side 76c similarly to the standard base 71 of the standard contactor 56. The first precharge curved side 76a is formed, for example, in a curved shape protruding outward, and the length of the arc is set to a dimension L2. The second precharge curved side 76b and the third precharge curved side 76c are formed, for example, in a curved shape that protrudes outward at an angle θ2 from each other.

The length dimension L2 of the first precharge curved side 76a is set larger than the length dimension L1 of the first curved side 71a. The angle θ2 between the second precharge curved side 76b and the third precharge curved side 76c is set to be larger than the angle θ1 between the second curved side 71b and the third curved side 71c.

The precharge base 76 has a precharge groove portion (groove portion) 78 formed over the entire outer circumference. The precharge groove portion 78 is formed so as to be able to fit the first contact portion 24b (see FIG. 4) of the first contact pin and the second contact portion 54b (see FIG. 6) of the second contact pin 54.

Moreover, according to FIG. 12, the precharge base 76 is fixed in a state orthogonal to the rotating shaft 58 by the rotating shaft 58 penetrating through a portion 76d of the precharge base 76 in the vicinity where the second precharge curved side 76b and the third precharge curved side 76c intersect.

Here, in a state where the fixed component 55 is arranged at the storage position, the second precharge curved side 76b is arranged at a position facing the first contact portion 24b, and the third precharge curved side 76c is arranged at a position facing the second contact portion 54b. In this state, the second precharge curved side 76b is kept in non-contact with the first contact portion 24b, and the third precharge curved side 76c is kept in non-contact with the second contact portion 54b.

Thereby, when the second connector 12 is coupled (connected) to the first connector 11, the precharge base 76 (that is, the precharge contactor 57) can be kept in a state of non-contact with respect to the first contact portion 24b and the second contact portion 54b.

The precharge conductor 77 is provided on the first precharge curved side 76a of the precharge base 76. The precharge conductor 77 is formed in a groove shape along the precharge groove portion 78 of the first precharge curved side 76a. Therefore, by being fitted to the first contact portion 24b (see FIG. 4) and the second contact portion 54b (see FIG. 6), the precharge conductor 77 can be brought into stable contact therewith. By being brought into simultaneous contact with the first contact portion 24b and the second contact portion 54b, the precharge conductor 77 becomes electrically conductive with the first contact pin 24 and the second contact pin 54.

Here, as described above, the rotating shaft 58 is fixed to the portion 76d of the precharge base 76 in the vicinity where the second precharge curved side 76b and the third precharge curved side 76c intersect. Therefore, the rotating shaft 58 is provided at a position offset in the direction away from the precharge conductor 77. As a result, the precharge contact element 57 rotates along with the rotating shaft 58, whereby the precharge conductor 77 can be brought into contact with the first contact portion 24b and the second contact portion 54b.

By forming the precharge base 76 with an insulator, the precharge conductor 77 can be brought into contact with the first contact portion 24b and the second contact portion 54b with high accuracy. Thereby, the timing accuracy of conduction can be improved.

As shown in FIGS. 11 and 12, when the precharge contactor 57 is compared to the standard contactor 56, the dimension L2 of the arc length of the first precharge curved side 76a is set to be larger than the dimension L1 of the arc length of the first curvature side 71a of the standard contactor 56. Further, the angle θ2 of the precharge contactor 57 is set to be larger than the angle θ1 of the standard contactor 56.

Therefore, the precharge conductor 77 of the precharge contactor 57 extends in the clockwise direction (arrow A direction) by a dimension L3 protruding with respect to the standard conductor 72. As a result, when the rotating shaft 58 rotates in the clockwise direction, the precharge conductor 77 makes contact with the first contact portion 24b (see FIG. 4) and the second contact portion 54b (see FIG. 6) earlier as compared with the standard conductor 72. That is, in the precharge contactor 57, when the rotating shaft 58 is rotated in the clockwise direction, the timing at which the first contact pin 24 and the second contact pin 54 are connected by the precharge conductor 77 is changed with respect to the timing by the standard conductor 72. That is, the timing at which the first contact pin 24 and the second contact pin 54 are connected differs between the standard contactor 56 and the precharge contactor 57 as the rotating shaft 58 rotates.

As shown in FIGS. 6 and 9, the fixed component 55, the standard contactor 56, and the precharge contactor 57 are integrally coupled to the rotating shaft 58. The rotating shaft 58 is rotatably supported in a state of penetrating the second left side wall 63 of the second mold 51, the second space block 53, and the second right side wall 64 of the second mold 51 in the X direction (left-right direction). In this state, the standard contactor 56 and the precharge contactor 57 are arranged in the space between the second left side wall 63 and the second space block 53 so as to be rotatable together with the rotating shaft 58. In the space between the second space block 53 and the second right side wall 64, the standard contactor 56 is arranged in a rotatable state together with the rotating shaft 58. Further, in the second space 66 of the second space block 53, the fixed component 55 is arranged in a rotatable state together with the rotating shaft 58.

When the rotating shaft 58 rotates in the clockwise direction (arrow A direction), for example, the standard contactor 56, the precharge contactor 57, and the fixed component 55 rotate clockwise together with the rotating shaft 58.

As the standard contactor 56 rotates in the clockwise direction, the standard conductor 72 makes contact with the first contact portion 24b of the first contact pin 24 (see FIG. 4) and the second contact portion 54b of the second contact pin 54. As a result, the first contact pin 24 and the second contact pin 54 can be made electrically conductive by the standard conductor 72.

Further, as the precharge contactor 57 rotates in the clockwise direction, the precharge conductor 77 makes contact with the first contact portion 24b of the first contact pin 24 (see FIG. 4) and the second contact portion 54b of the second contact pin 54. Thereby, the first contact pin 24 and the second contact pin 54 can be made electrically conductive by the precharge conductor 77.

Here, the precharge conductor 77 of the precharge contactor 57 extends in the clockwise direction by the protruding dimension L3 with respect to the standard conductor 72 of the standard contactor 56. As a result, in the state of the rotating shaft 58 being rotated in the clockwise direction, the timing at which the first contact pin 24 and the second contact pin 54 are brought into electrical conductivity (connected) by the precharge conductor 77 is changed with respect to the timing of being brought into electrical conductivity by the standard conductor 72 of the standard contactor 56.

Next, an example of coupling (assembling) the second connector 12 to the first connector 11 of the contactor rotary connector 10 will be described with reference to FIGS. 1 and 2.

As shown in FIG. 2, the second mold 51 is inserted toward the first opening 36 of the first mold 21 in the Y direction (specifically, in the arrow B direction). The second guide 52 formed on the second right side wall 64 of the second mold 51 is locked in the state of being housed in the first guide groove 42 formed on the first right side wall 34 of the first mold 21.

Similarly, the second guide 52 formed on the second left side wall 63 of the second mold 51 is locked in the state of being housed in the first guide groove 42 (see FIG. 3) formed on the first left side wall 33 of the first mold 21.

In this state, the second mold 51 is inserted into the inside of the first mold 21 from the first opening 36 of the first mold 21. The second mold 51 inserted inside the first mold 21 is continuously inserted in the direction of arrow B toward the first space block 23.

In this state, the left end of the rotating shaft 58 moves to the left recess 38 of the first left side wall 33, and the right end of the rotating shaft 58 moves to the right recess 39 of the first right side wall 34.

As shown in FIG. 1, the front surface 53a formed on the second space block 53 of the second mold 51 contacts the rear surface 23a formed on the first space block 23 of the first mold 21. In this state, the second mold 51 is kept inserted inside the first mold 21.

In this way, the first guide groove 42 is formed in the first mold 21, and the second guide 52 is formed in the second mold 51. As a result, the second mold 51 can be smoothly inserted into the first mold 21 by accommodating the second guide 52 in the first guide groove 42. That is, the second connector 12 can be smoothly inserted into and coupled with the first connector 11.

Here, in general, when a circuit board is inserted into or removed from a device in operation, the circuit board is tilted, whereby a contact pin of the connector may come into contact with an adjacent contact pin. In order to prevent this, it was necessary to float the circuit board during insertion and removal of the circuit board.

Therefore, as shown in FIGS. 3 and 6, by arranging the fixed component 55 in the storage position, the fixed component 55 is kept in non-contact with the first space block 23 and the first contact pin 24. Further, the second curved side 71b (see FIG. 11) is kept in non-contact with the first contact portion 24b. In addition, the second precharge curved side 76b (see FIG. 12) is kept in non-contact with the first contact portion 24b. Thereby, the second mold 51 can be smoothly inserted into the first mold 21.

Moreover, a key or the like is attached to an end of the rotating shaft 58, and the key and the rotating shaft 58 are operated in conjunction with each other. This makes it possible to realize a function in addition to a connector fixing operation, such as preventing unauthorized removal of the connector (circuit board).

Next, an example of rotating the fixed component 55 of the contactor rotary connector 10 will be described with reference to FIG. 1 and FIGS. 13A to 13C.

Figure 13A:
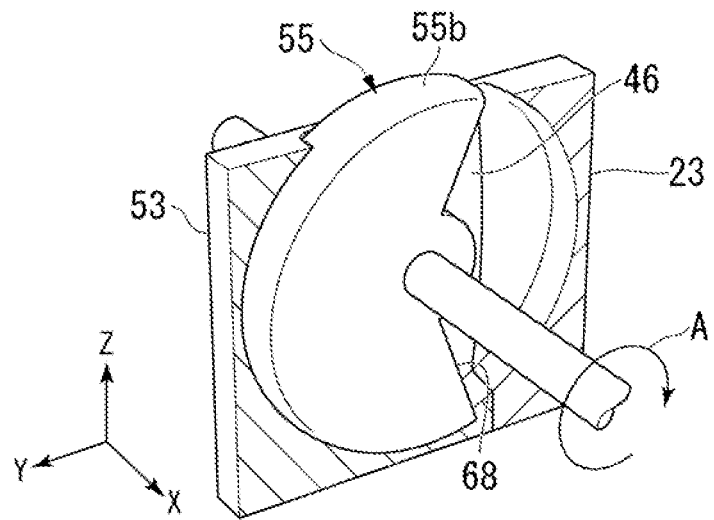
FIG. 13A is a perspective view showing a state in which the fixed component according to the first embodiment is rotatably stored in a fixed space.

As shown in FIGS. 1 and 13A, when the second mold 51 is inserted into the first mold 21, the fixed component 55 is rotatably stored in the fixed space 46 of the first space block 23 and the second space block 53. As the rotating shaft 58 rotates in the clockwise direction, the fixed component 55 rotates in the clockwise direction in the fixed space 46.

Figure 13B:
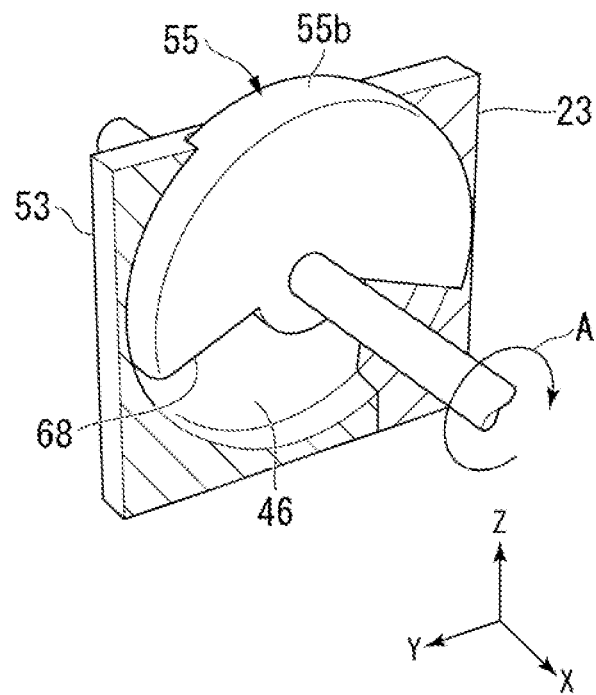
FIG. 13B is a perspective view showing a state in which the fixed component in the first embodiment rotates in the fixed space.
Figure 13C:
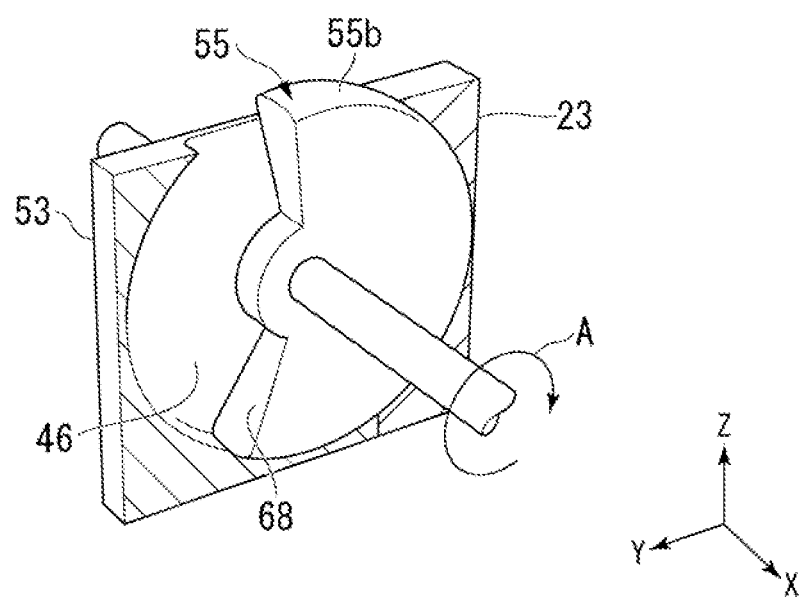
FIG. 13C is a perspective view showing a state in which the fixed component in the first embodiment continuously rotates in the fixed space.

As shown in FIGS. 13B and 13C, as a result of the rotation of the fixed component 55 in the clockwise direction, the occurrence of misalignment or slip off between the first space block 23 and the second space block 53 can be prevented by the fixed component 55. As a result, the first mold 21 and the second mold 51 can be held in an accurately inserted (coupled) state, in the state of misalignment or slip off between the first mold 21 and the second mold 51 being prevented by the rotation of the fixed component 55 in the clockwise direction.

Next, the operation of bringing the first contact pin 24 and the second contact pin 54 into electrical conduction will be described with reference to FIG. 1 and FIGS. 13 to 16. In FIGS. 14 to 16, the first contact pin 24 with which the precharge contactor 57 makes contact is described as "one first contact pin 24", and the first contact pin 24 with which the standard contactor 56 makes contact is described as "the other first contact pin 24". The second contact pin 54 with which the precharge contactor 57 makes contact is described as "one second contact pin 54", and the second contact pin 54 with which the standard contactor 56 makes contact is described as "the other second contact pin 54".

Figure 14A:
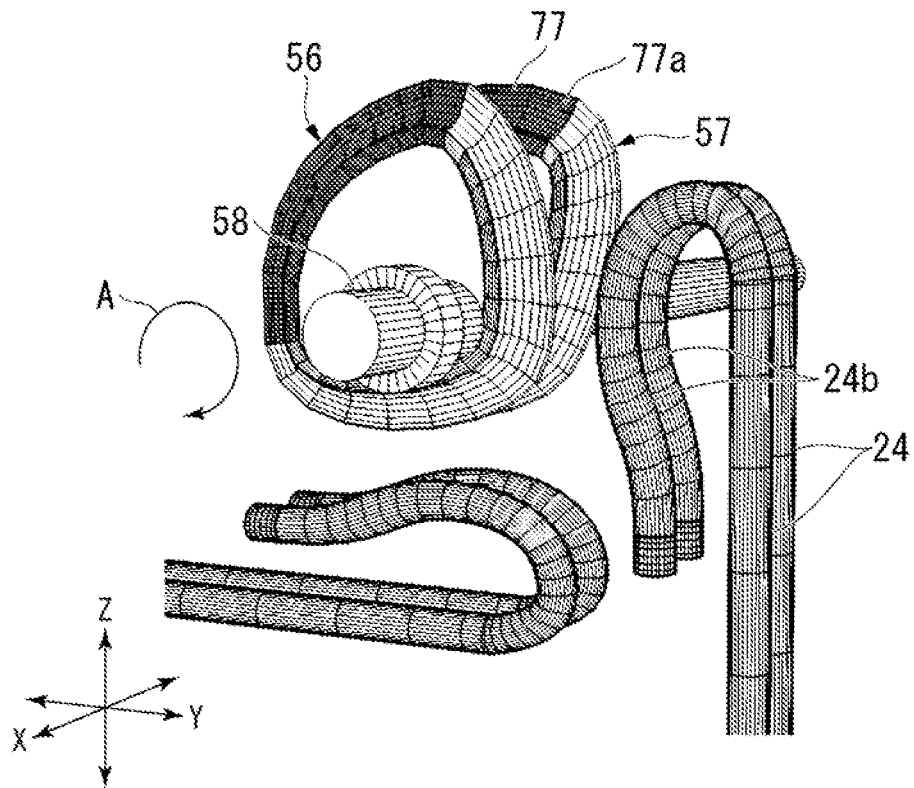
FIG. 14A is a perspective view showing a state in which the standard contactor and the precharge contactor in the first embodiment rotate toward the first contact portion.

As shown in FIGS. 1 and 14A, with the second mold 51 inserted in the first mold 21, the rotating shaft 58 rotates in the clockwise direction (arrow A direction). Therefore, the standard contactor 56 and the precharge contactor 57 rotate in the clockwise direction toward the first contact portion 24b.

Figure 14B:
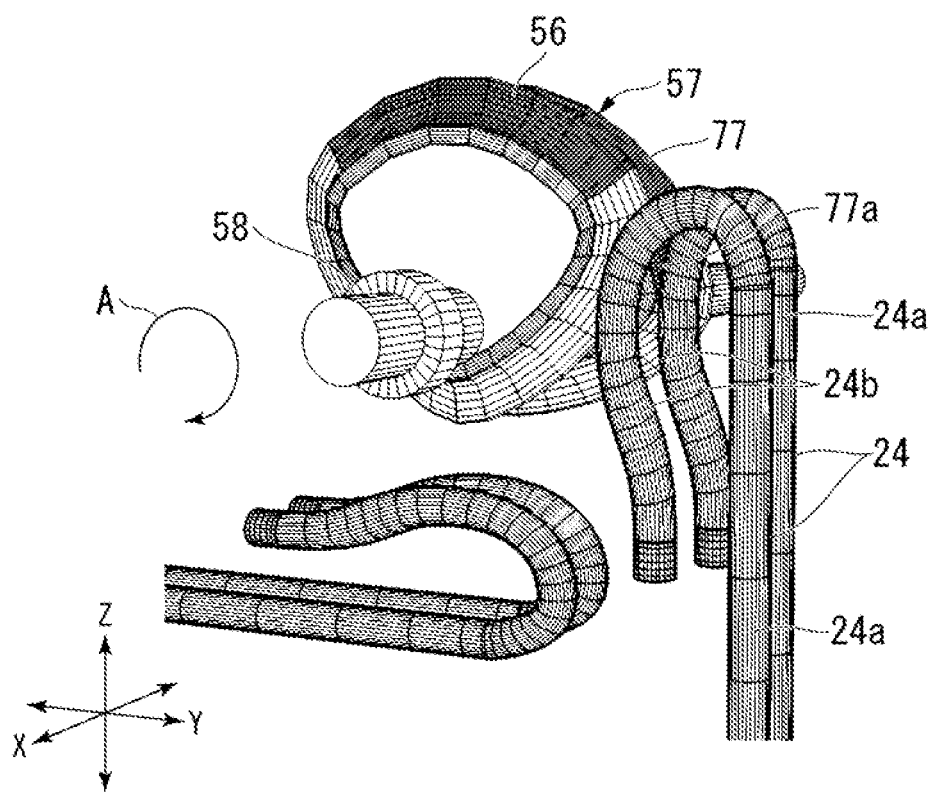
FIG. 14B is a perspective view showing a state in which the precharge contactor in the first embodiment is in contact with one first contact portion.

As shown in FIGS. 1 and 14B, one end 77a of the precharge conductor 77 of the precharge contactor 57 comes into contact with one first contact portion 24b. Here, the fixed component 55 rotates in the clockwise direction together with the rotating shaft 58 in the fixed space 46 (see FIGS. 13A to 13C). Therefore, misalignment or slip off between the first mold 21 and the second mold 51 is prevented from occurring. That is, the precharge contactor 57 is accurately positioned with respect to one first contact portion 24b. As a result, the one end 77a of the precharge conductor 77 can be stably brought into contact (connection) with one first contact portion 24b.

Therefore, the precharge conductor 77 exerts a pressing force (pressing) on the one first contact portion 24b toward one first base portion 24a, and the one first contact portion 24b elastically deforms toward the one first base portion 24a. As a result, a repulsive force is generated in the one first contact pin 24, and the repulsive force of the one first contact pin 24 keeps the one first contact portion 24b in a state of stable contact with the one end 77a of the precharge conductor 77.

Figure 15A:
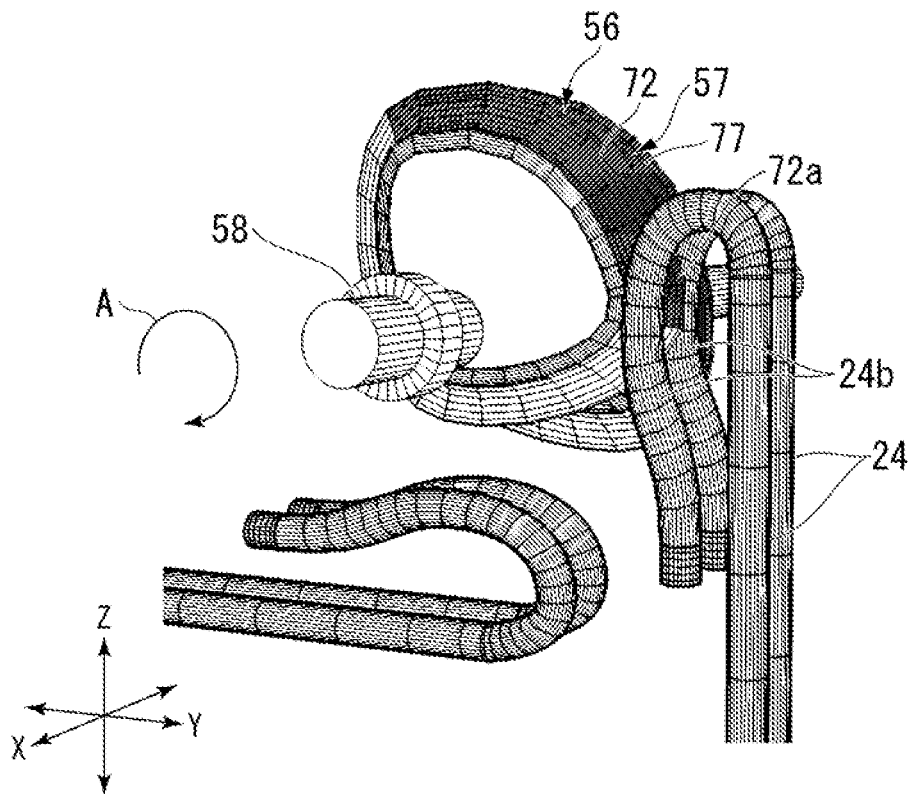
FIG. 15A is a perspective view showing a state in which the standard contactor in the first embodiment is in contact with the other first contact portion.
Figure 16:
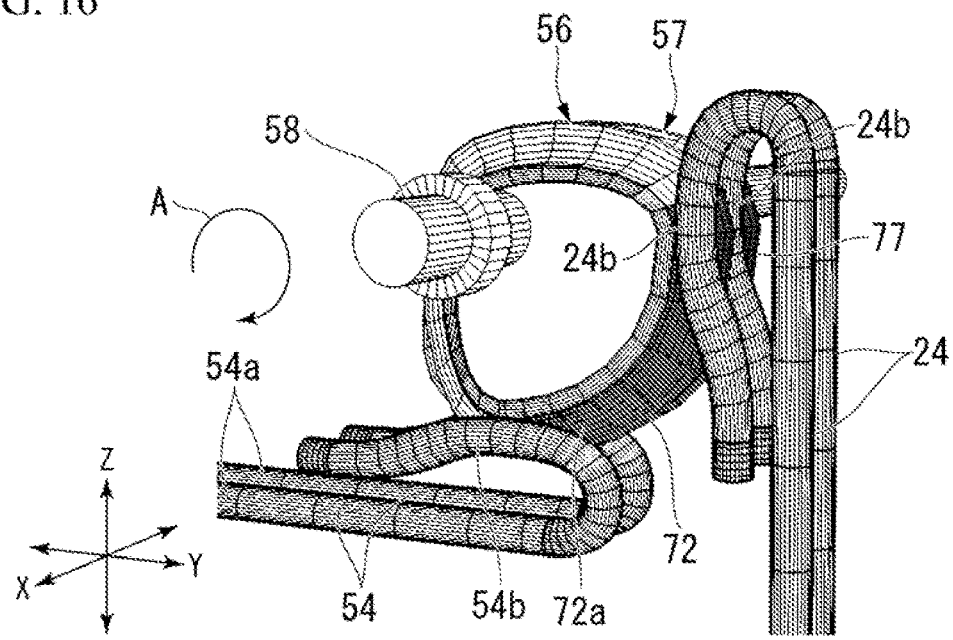
FIG. 16 is a perspective view showing a state in which the standard contactor in the first embodiment is in contact with the other second contact portion.

As shown in FIGS. 1 and 15A, the precharge conductor 77 continuously rotates in the clockwise direction in a state of being in contact with the one first contact portion 24b. As the standard contactor 56 continuously rotates in the clockwise direction, one end 72a of the standard conductor 72 comes into contact with the other first contact portion 24b.

Here, the fixed component 55 rotates in the clockwise direction together with the rotating shaft 58 in the fixed space 46 (see FIGS. 13A to 13C). Therefore, the occurrence of misalignment or slip off between the first mold 21 and the second mold 51 is prevented. That is, the standard contactor 56 is accurately positioned with respect to the other first contact portion 24b. As a result, the one end 72a of the standard conductor 72 can be stably brought into contact (connection) with the other first contact portion 24b.

Therefore, the standard conductor 72 exerts a pressing force (pressing) on the other first contact portion 24b toward the first base portion 24a, and the other first contact portion 24b elastically deforms toward the other first base portion 24a. As a result, a repulsive force is generated in the other first contact pin 24, and the repulsive force of the other first contact pin 24 keeps the other first contact portion 24b in a state of stable contact with the one end 72a of the standard conductor 72.

Figure 15B:
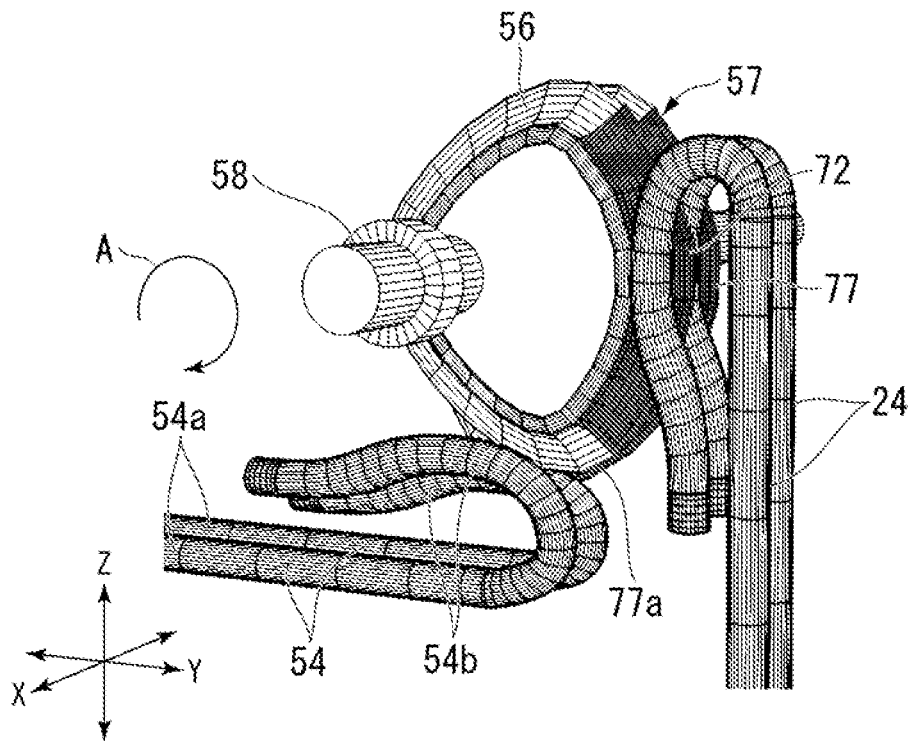
FIG. 15B is a perspective view showing a state in which the precharge contactor in the first embodiment is in contact with one second contact portion.

As shown in FIG. 15B, the precharge contactor 57 and the standard contactor 56 are continuously rotated in the clockwise direction. The one end 77a of the precharge conductor 77 of the precharge contactor 57 makes contact with one second contact portion 54b.

Therefore, the precharge conductor 77 exerts a pressing force (pressing) on the one first contact portion 24b toward one first base portion 24a, and the one first contact portion 24b elastically deforms toward the one first base portion 24a. As a result, a repulsive force is generated in the one first contact pin 24, and the repulsive force of the one first contact pin 24 keeps the one first contact portion 24b in a state of stable contact with the one end 77a of the precharge conductor 77.

The precharge conductor 77 exerts a pressing force (pressing) on one second contact portion 54b toward one second base portion 54a, and the one second contact portion 54b elastically deforms toward the one second base portion 54a. As a result, a repulsive force is generated in the one second contact pin 54, and the repulsive force of the one second contact pin 54 keeps the one second contact portion 54b in a state of stable contact with the one end 77a of the precharge conductor 77.

In this state, the one first contact pin 24 and the one second contact pin 54 are brought into electrical conductivity (connected) by the precharge conductor 77.

As shown in FIG. 16, the precharge contactor 57 and the standard contactor 56 are continuously rotated in the clockwise direction. The one end 72a of the standard conductor 72 of the standard contactor 56 makes contact with the other second contact portion 54b.

Therefore, the standard conductor 72 exerts a pressing force (pressing) on the other second contact portion 54b toward the other second base portion 54a, and the other second contact portion 54b elastically deforms toward the other second base portion 54a. As a result, a repulsive force is generated in the other second contact pin 54, and the repulsive force of the other second contact pin 54 keeps the other second contact portion 54b in a state of stable contact with one end 72a of the standard conductor 72.

In this state, the other first contact pin 24 and the other second contact pin 54 are brought into electrical conductivity (connected) by the standard conductor 72.

In this way, the timing at which the one first contact pin 24 and the one second contact pin 54 are brought into electrical conductivity by the precharge contactor 57, and the timing at which the other first contact pin 24 and the other second contact pin 54 are brought into electrical conductivity by the standard contactor 56 can be made to differ. Further, the timing of disconnecting the conductivity between the one first contact pin 24 and the one second contact pin 54 and the timing of disconnecting the conductivity between the other first contact pin 24 and the other second contact pin 54 can be made to differ.

That is, according to the standard contactor 56 and the precharge contactor 57, the conduction timing and the disconnection timing between the first contact pin 24 and the second contact pin 54 can be made to differ without changing the shapes or installation locations of the first contact pin 24 and the second contact pin 54.

In general, the contact pins are integrated with the connector molds, with the contact control of the contact pins being the same as the fitting operation of the connectors, and so the connection operation of the contact pins could not be controlled separately. For this reason, the connection between the power supply system and the signal system is the same as a physical operation, and so in order to change the connection timing of each, it was necessary to separately control the connection by an electrical circuit prepared on the circuit board.

Therefore, the standard contactor 56 and the precharge contactor 57 are used to make the conduction timing and the disconnection timing of the first contact pins 24 and the second contact pins 54 different.

In this way, the connection operation and timing of the first contact pin 24 and the second contact pin 54 can be changed by the shape of the contactor for each contact pin to be connected. Thereby it is possible to change the connection timing of the power supply pin and the signal pin of the circuit board, realize a precharge operation, and eliminate the signal line connection control circuit when connecting the connectors.

It is possible to individually control the timing of the coupling (insertion) operation of the first connector 11 and the second connector 12 and the connection operation of the first contact pin 24 and the second contact pin 54. As a result, when inserting a circuit board or the like into a device in operation, it is possible to prevent contact between the adjacent first contact pin 24 and the second contact pin 54 caused by oblique insertion of the circuit board.

Hereinbelow, contactor rotary connectors of the second to sixth embodiments will be described with reference to FIGS. 17 to 21. In the contactor rotary connectors of the second to sixth embodiments, the same members as those of the contactor rotary connector 10 of the first embodiment and similar members are designated by the same reference numerals, and detailed descriptions thereof will be omitted.

Second Embodiment

Figure 17A:
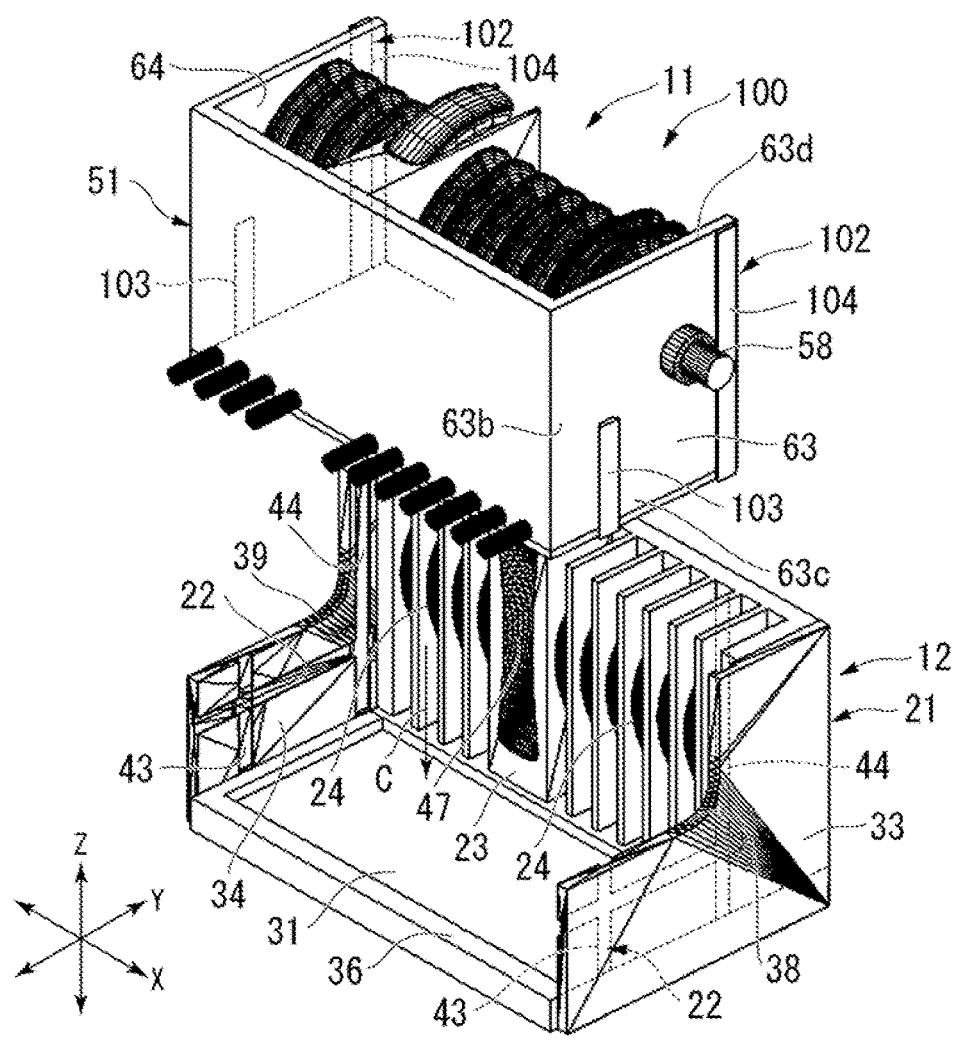
FIG. 17A is an exploded perspective view showing a contactor rotary connector in the second embodiment.

As shown in FIG. 17A, the contactor rotary connector 100 is provided with a second guide 102 on the second left side wall 63 and the second right side wall 64 of the second mold 51. Other configurations are the same as those of the contactor rotary connector 10 of the first embodiment.

The second guide 102 of the second left wall 63 and the second guide 102 of the second right wall 64 are symmetrical parts. Therefore, the second guide 102 of the second right side wall 64 and the second guide 102 of the second left side wall 63 are designated by the same reference numeral, and a detailed description of the second guide 102 of the second right side wall 64 will be omitted.

The second guide 102 is provided with a first convex guide 103 and a second convex guide 104. The first convex guide 103 projects outward from the second left side wall 63 at a portion near the rear side 63b of the second left side wall 63. The first convex guide 103 extends from the bottom 63c of the second left side wall 63 toward the center of the second left side wall 63 in the Z direction (upward). The first convex guide 103 is formed to be movable in the Z direction along the second guide groove 43 of the first left side wall 33 in a state of being housed (locked) in the second guide groove 43 of the first left side wall 33.

The second convex guide 104 projects outward from the second left side wall 63 at the front side 63a of the second left side wall 63. The second convex guide 104 extends from the bottom side 63c of the second left side wall 63 toward the upper side 63d of the second left side wall 63 in the Z direction (upward). The second convex guide 104 is formed to be movable in the Z direction along the third guide groove 44 of the first left side wall 33 in a state of being housed (locked) in the third guide groove 44 of the first left side wall 33.

Next, an example in which the second connector 12 is coupled (assembled) to the first connector 11 in the contactor rotary connector 100 of the second embodiment will be described with reference to FIGS. 17A and 17B.

As shown in FIG. 17A, the second mold 51 is inserted toward the first opening 36 of the first mold 21 in the Z direction (specifically, the arrow C direction). The first convex guide 103 and the second convex guide 104 formed on the second right side wall 64 of the second mold 51 are locked in a state of being housed in the second guide groove 43 and the third guide groove 44 formed in the first right side wall 34 of the first mold 21.

Similarly, the first convex guide 103 and the second convex guide 104 formed on the second left side wall 63 of the second mold 51 are locked in a state of being housed in the second guide groove 43 and the third guide groove 44 formed in the first left side wall 33 of the first mold 21.

In this state, the second mold 51 is inserted into the inside of the first mold 21 from the first opening 36 of the first mold 21. The second mold 51 inserted inside the first mold 21 is continuously inserted in the direction of arrow C toward the first base 31.

In this state, the left end of the rotating shaft 58 moves to the left recess 38 of the first left side wall 33, and the right end of the rotating shaft 58 moves to the right recess 39 of the first right side wall 34.

Figure 17B:
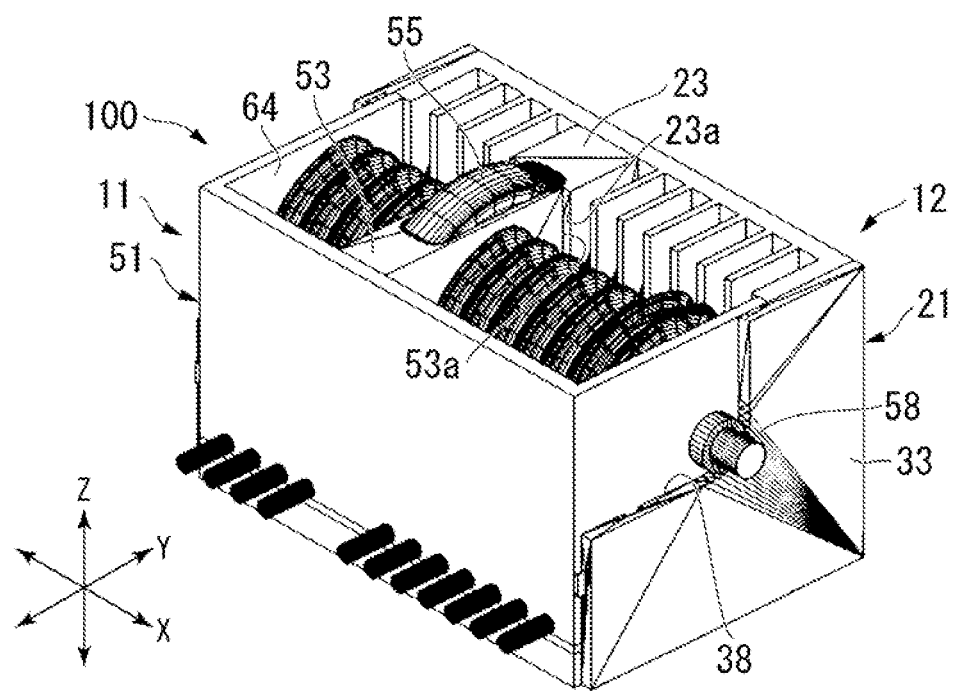
FIG. 17B is a perspective view showing a contactor rotary connector in the second embodiment.

As shown in FIG. 17B, the front surface 53a formed on the second space block 53 of the second mold 51 contacts the rear surface 23a formed on the first space block 23 of the first mold 21. In this state, the second mold 51 is kept in a state of insertion in the first mold 21.

As described above, the second guide groove 43 and the third guide groove 44 are formed in the first mold 21, and the first convex guide 103 and the second convex guide 104 are formed on the second mold 51. Thereby, the first convex guide 103 and the second convex guide 104 are housed in the second guide groove 43 and the third guide groove 44, whereby the second mold 51 can be smoothly inserted into the first mold 21. That is, the second connector 12 can be smoothly inserted into and coupled with the first connector 11.

Third Embodiment

Figure 18A:
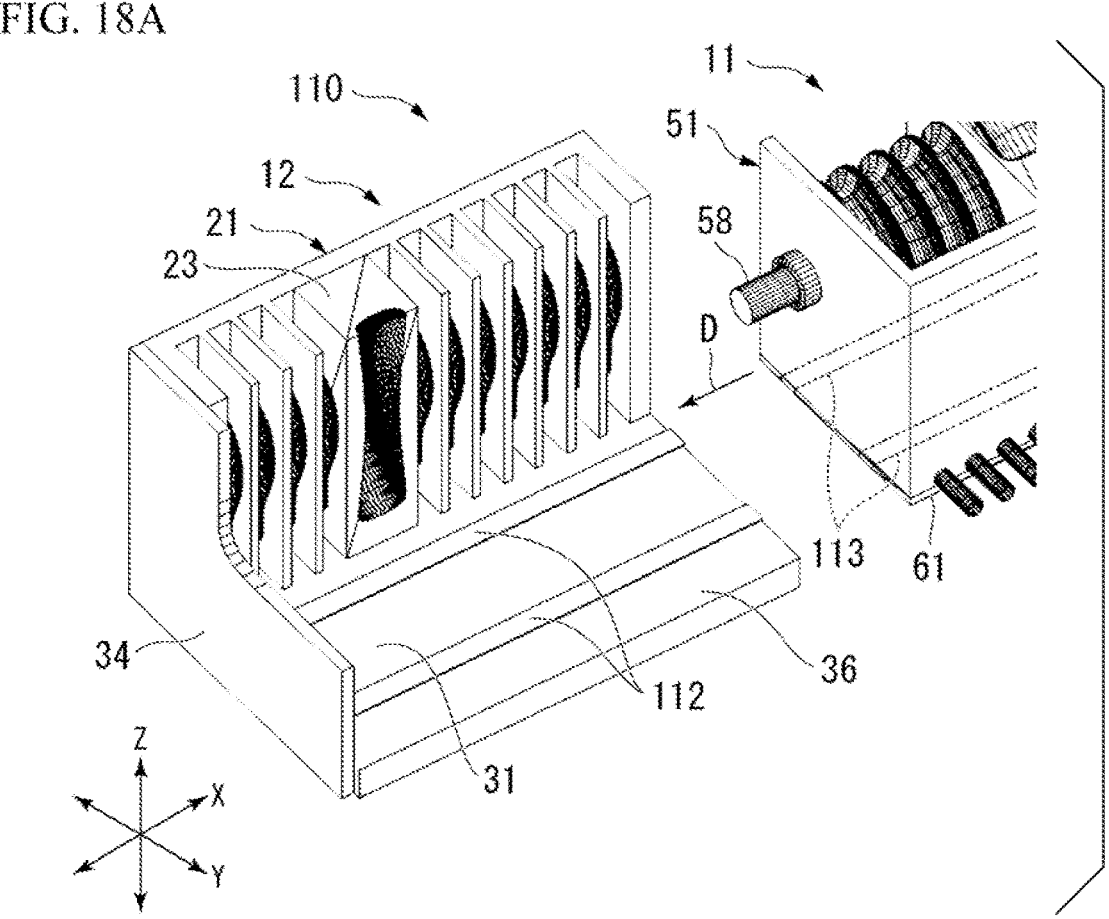
FIG. 18A is an exploded perspective view showing a contactor rotary connector in a third embodiment.

As shown in FIG. 18A, the contactor rotary connector 110 is provided with a first guide 112 in the first mold 21 and a second guide 113 in the second mold 51. Other configurations are the same as those of the contactor rotary connector 10 of the first embodiment.

The first guide 112 protrudes inward from the inner surface of the first base 31 in the first mold 21 and extends in the X direction (left-right direction). The second guide 113 is formed in a concave groove that opens to the outer surface of the second base 61 in the second mold 51 and can be fitted (locked) to the first guide 112. Like the first guide 112, the second guide 113 extends in the X direction (left-right direction). The second guide 113 is formed so as to be movable in the X direction along the first guide 112 in a state of being fitted (locked) to the first guide 112.

Next, an example in which the second connector 12 is coupled (assembled) to the first connector 11 in the contactor rotary connector 110 of the third embodiment will be described with reference to FIGS. 18A and 18B.

As shown in FIG. 18A, the second mold 51 is inserted in the X direction (specifically, the arrow D direction) toward the first opening 36 of the first mold 21. The second guide 113 of the second mold 51 is locked in a state of being fitted (locked) to the first guide 112 of the first mold 21.

In this state, the second mold 51 is inserted into the inside of the first mold 21 from the first opening 36 of the first mold 21. The second mold 51 inserted inside the first mold 21 is continuously inserted in the direction of arrow D toward the first right side wall 34.

Figure 18B:
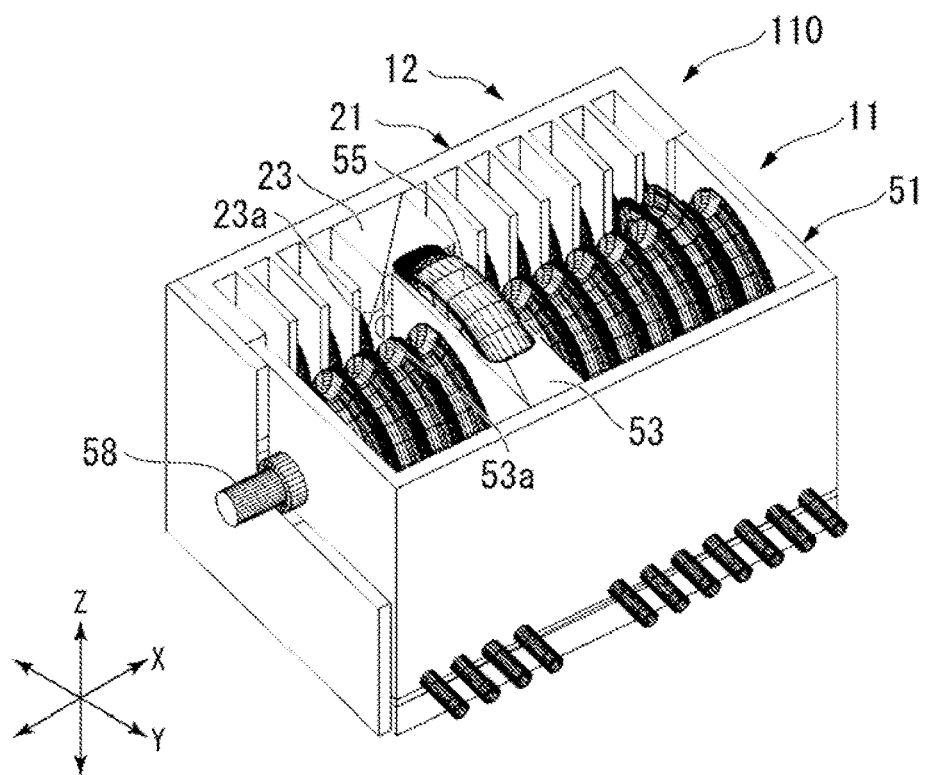
FIG. 18B is a perspective view showing a contactor rotary connector in the third embodiment.

As shown in FIG. 18B, the front surface 53a formed on the second space block 53 of the second mold 51 contacts the rear surface 23a formed on the first space block 23 of the first mold 21. In this state, the second mold 51 is kept in a state of being inserted inside the first mold 21.

In this way, the first guide 112 is formed on the first mold 21, and the second guide 113 is formed on the second mold 51. As a result, the second mold 51 can be smoothly inserted into the first mold 21 by fitting (locking) the second guide 113 to the first guide 112. That is, the second connector 12 can be smoothly inserted into and coupled with the first connector 11.

Further, as described from the first embodiment to the third embodiment, just by changing the shapes of the first guides 22, 112 and the second guides 52, 102, 113, it is possible to insert the second connector 12 into the first connector 11 from various directions such as the X (left and right) direction, Y (front and back) direction, and Z (up and down) direction to be coupled therewith.

As a result, for example, by inserting the second connector 12 into the first connector 11 from the X (left and right) direction, it is possible to enable connection with a printed wiring board installed on a surface different from the direction of installation (insertion) into the device or a printed wiring board.

For example, when installing a printed wiring board from the front of the device, a printed wiring board having a connection connector at the interior rear of the device is usually provided. On the other hand, according to the contactor rotary connectors 10, 100, 110 of the first to third embodiments, installation is possible at any location on the right, left, top or bottom of the interior of the device with respect to the positional relationship with the installation (insertion) direction of the printed wiring board.

Fourth Embodiment

Figure 19A:
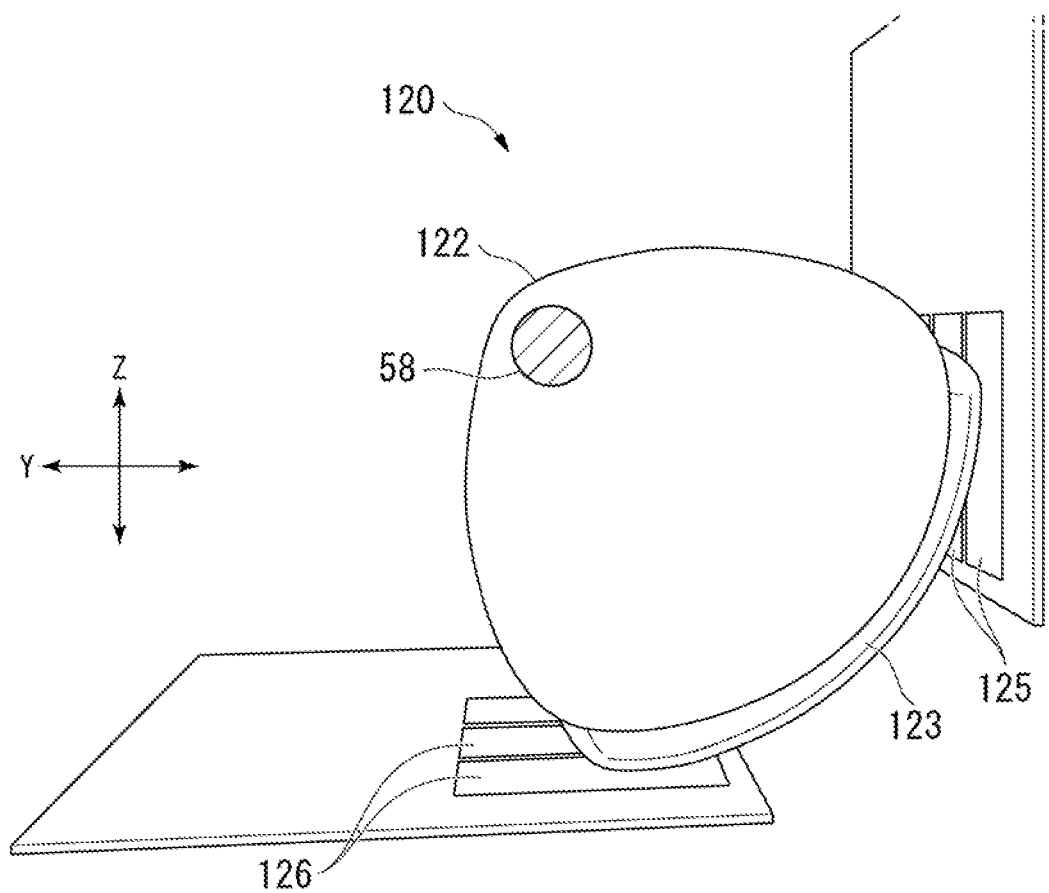
FIG. 19A is a side view showing a contactor, a first card edge, and a second card edge in the fourth embodiment.
Figure 19B:
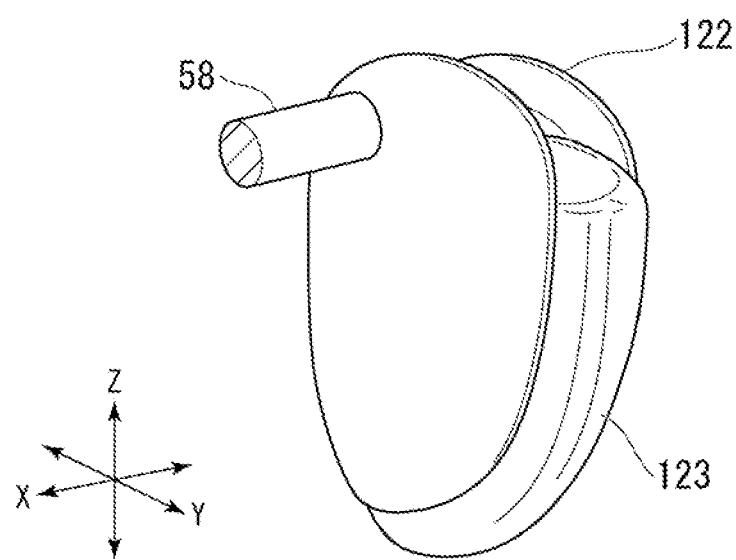
FIG. 19B is a perspective view showing a contactor in the fourth embodiment.

In the contactor rotary connector 120 as shown in FIGS. 19A and 19B, the standard contactor 56 of the first embodiment is replaced with a contactor 122. Further, the contact rotary connector 120 is one in which the first contact pin 24 and the second contact pin 54 of the first embodiment are respectively changed to a first card edge (edge connector, first terminal) 125 and a second card edge (edge connector, second terminal) 126.

The contactor 122 is provided with a conductor 123 formed in a convex shape. By forming the conductor 123 in a convex shape, the conductor 123 of the contactor 122 can be brought into contact with the first card edge 125 and the second card edge 126.

Further, the precharge contactor 57 of the first embodiment can also be made a contactor provided with a convex conductor like the contactor 122. Thereby it is possible to expand the applications of the contactor rotary connector.

Fifth Embodiment

Figure 20A:
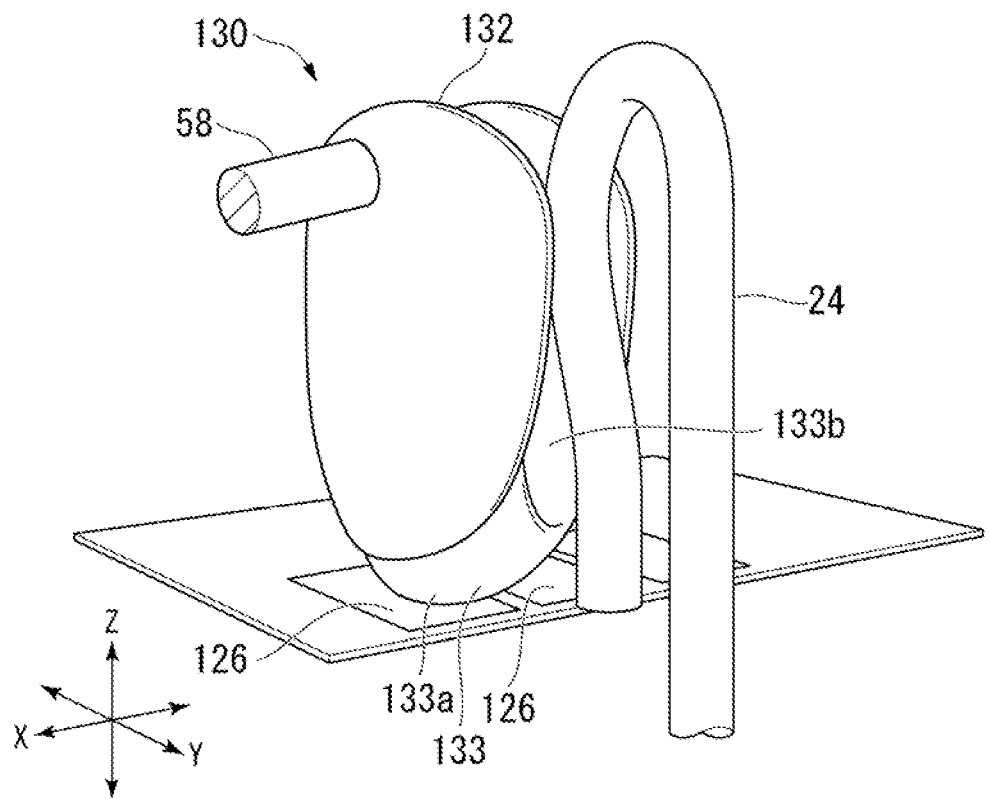
FIG. 20A is a perspective view showing a contactor, a first contact pin, and a second card edge in the fifth embodiment.
Figure 20B:
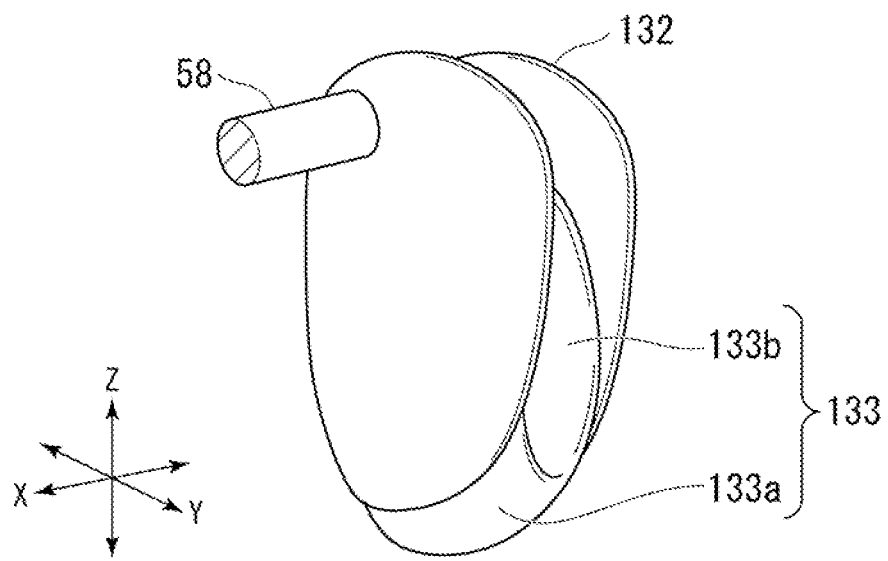
FIG. 20B is a perspective view showing a contactor in the fifth embodiment.

As shown in FIGS. 20A and 20B, the contactor rotary connector 130 is one in which the standard contactor 56 of the first embodiment is replaced with the contactor 132. Further, the contactor rotary connector 130 is one in which the second contact pin 54 of the first embodiment is replaced with a second card edge (edge connector, second terminal) 126.

The contactor 132 is provided with a conductor 133 in which a portion 133a is formed in a convex shape. Specifically, the conductor 133 has a part 133b formed in a groove shape similarly to the first embodiment and a portion 133a formed in a convex shape. Therefore, the conductor 133 of the contactor 132 can be brought into contact with the first contact pin 24 and the second card edge 126.

Further, the precharge contactor 57 of the first embodiment can be made a contactor provided with a groove-shaped part and a convex part in the conductor, similarly to the contactor 132. This makes it possible to expand the applications of the contactor rotary connector.

Sixth Embodiment of Minimum Configuration of Contactor Rotary Connector 10

Figure 21:
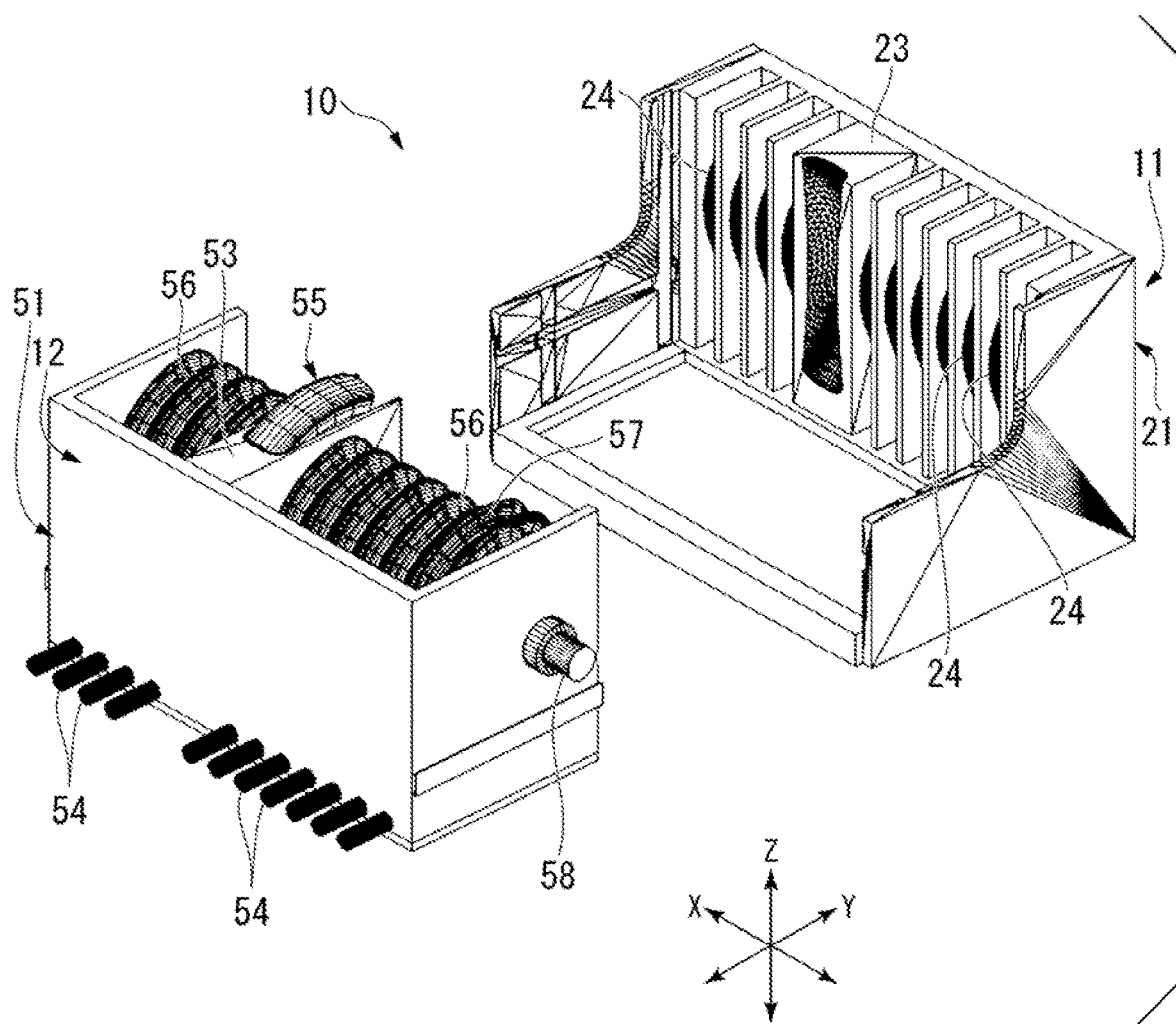
FIG. 21 is an exploded perspective view showing a contactor rotary connector in a sixth embodiment having a minimum configuration.

A sixth embodiment of the minimum configuration of the contactor rotary connector 10 will be described with reference to FIG. 21.

The contactor rotary connector 10 is provided with a first connector 11 in which the first terminal 24 is supported by the first mold 21, and a second connector 12 in which the second terminal 54 is supported by the second mold 51.

The first connector 11 is provided with a first space block 23. The first space block 23 is provided in the first mold 21.

The second connector 12 is provided with a second space block 53, a fixed component 55, contactors 56 and 57, and a rotating shaft 58.

The second space block 53 is provided in the second mold 51.

The fixed component 55 is rotatably housed in the first space block 23 and the second space block 53 in a state of the second mold 51 being coupled to (inserted in) the first mold 21. As a result, the first mold 21 and the second mold 51 are held in a coupled state.

The contactors 56 and 57 are formed so as to be capable of making contact with the first contact pin 24 and the second contact pin 54.

The rotating shaft 58 integrally couples the contactors 56, 57 and the fixed component 55, and is rotatably supported by one of the first mold 21 and the second mold 51. By rotating the rotating shaft 58 to rotate the contactors 56 and 57, the first contact pin 24 and the second contact pin 54 are connected (brought into electrical conduction) by the contactors 56 and 57.

Therefore, by rotatably housing the fixed component 55 in the first space block 23 and the second space block 53, the first mold 21 and the second mold 51 can be held in the coupled state. Here, by rotating the fixed component 55 on the rotating shaft 58, it is possible to prevent the occurrence of misalignment or slip off between the first space block 23 and the second space block 53.

In other words, by rotating the fixed component 55 in the first space block 23 and the second space block 53, it is possible to prevent the occurrence of misalignment or slip off between the first mold 21 and the second mold 51. Therefore, the first mold 21 and the second mold 51 can be accurately held in a coupled state. As a result, the contactors 56 and 57 can be brought into stable contact (connection) with the first terminal 24 and the second terminal 54.

While embodiments of the present invention have been described above, these embodiments have been presented by way of examples and are not intended to limit the scope of the invention. This embodiments can be embodied in a variety of other configurations, and various omissions, substitutions, and changes can be made without departing from the gist of the invention. These embodiments and modifications thereof are included in the scope and gist of the invention, as well as in the scope of the invention described in the claims and the equivalent scope thereof.

For example, in the above-described embodiments, an example was described in which the standard base 71 of the standard contactor 56 and the precharge base 76 of the precharge contactor 57 are formed in a substantially triangular shape (fan shape), but the present invention is not limited thereto. As another example, for example, the standard contactor 56 and the precharge contactor 57 need only have shapes capable of supporting the standard conductor 72 and the precharge conductor 77.

Further, the arrangement of the standard contactor 56 and the precharge contactor 57 described in the above embodiments can be arbitrarily changed.

Moreover, in the above-described embodiments, an example in which the rotating shaft 58 is rotatably supported by the second mold 51 has been described. However, as another example, the rotating shaft 58 may be rotatably supported by the first mold 21.

Priority is claimed on Japanese Patent Application No. 2019-090559, filed May 13, 2019, the content of which is incorporated herein by reference.

INDUSTRIAL APPLICABILITY

According to the present invention, contactors can be stably connected to terminals.

REFERENCE SIGNS LIST 10, 100, 110, 120, 130: Contactor rotary connector
11: First connector
12: Second connector
21: First mold
22, 112: First guide
23: First space block
24: First contact pin (first terminal)
31: First base (base)
51: Second mold
52, 102, 113: Second guide
53: Second space block
54: Second contact pin (second terminal)
55: Fixed component
56: Standard contactor (contactor)
57: Precharge contactor (contactor)
58: Rotating shaft
68: Fixed recess (recess)
71: Standard base (base)
72: Standard conductor (conductor)
74: Standard groove portion (groove portion)
76: Precharge base (base)
77: Precharge conductor (conductor)
78: Precharge groove portion (groove portion)
125: First card edge (first terminal)
126: Second card edge (second terminal)
123, 133: Conductor
122, 132: Contactor

What is claimed is:

1. A contactor rotary connector comprising:
a first connector having a first terminal supported by a first mold; and
a second connector having a second terminal supported by a second mold,
wherein the first connector comprises a first space block provided in the first mold, and
the second connector comprises:
a second space block provided in the second mold;
a fixed component capable of holding the first mold and the second mold in a coupled state by being rotatably housed in the first space block and the second space block in a state in which the second mold is coupled to the first mold;
a contactor capable of contacting the first terminal and the second terminal; and
a rotating shaft that integrally couples the contactor and the fixed component, is rotatably supported by one of the first mold and the second mold, and is capable of connecting the first terminal and the second terminal by rotating the contactor, wherein the first terminal is a first contact pin, and the second terminal is a second contact pin, wherein the contactor comprises:

a base that is an insulator and has a groove portion which fits the first contact pin and the second contact pin; and a conductor provided in the groove portion and electrically conducting the first contact pin and the second contact pin.

2. The contactor rotary connector according to claim 1, wherein the first contact pin and the second contact pin are provided with elasticity to be brought into contact with the conductor due to repulsive force against pressing by the conductor.

3. The contactor rotary connector according to claim 1, wherein the contactor is provided at a position where the rotating shaft is offset in a direction away from the conductor.

4. The contactor rotary connector according to claim 1, further comprising:

a first guide provided in the first mold; and a second guide provided in the second mold and coupling the second mold to the first mold by locking with the first guide.

5. The contactor rotary connector according to claim 1, wherein the contactor is of a shape that keeps non-contact with the first space block and the first terminal when coupling the first connector and the second connector.

6. The contactor rotary connector according to claim 5, wherein the fixed component has a circular shape when viewed from an axial direction of the rotating shaft, and has a recess so as to maintain non-contact with the first space block and the first terminal when coupling the first connector and the second connector.

7. The contactor rotary connector according to claim 1, wherein the first terminal is a first card edge;

the second terminal is a second card edge; and the contactor comprises a convex conductor that contacts the first card edge and the second card edge.

8. The contactor rotary connector according to claim 1, wherein the contactor comprises:

a standard contactor; and a precharge contactor in which the timing of connecting the first terminal and the second terminal is changed with respect to the standard contactor.

* * * * *